US011429747B2

(12) United States Patent
Shigeta

(10) Patent No.: US 11,429,747 B2
(45) Date of Patent: Aug. 30, 2022

(54) DATA MANAGEMENT LEVEL DETERMINING METHOD

(71) Applicant: FUJITSU LIMITED, Kawasaki (JP)

(72) Inventor: Soichi Shigeta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 467 days.

(21) Appl. No.: 16/553,293

(22) Filed: Aug. 28, 2019

(65) Prior Publication Data
US 2020/0089913 A1 Mar. 19, 2020

(30) Foreign Application Priority Data

Sep. 19, 2018 (JP) .............................. JP2018-174728

(51) Int. Cl.
*G06F 21/00* (2013.01)
*G06F 21/62* (2013.01)
*G06F 16/953* (2019.01)

(52) U.S. Cl.
CPC ........ *G06F 21/6254* (2013.01); *G06F 16/953* (2019.01)

(58) Field of Classification Search
CPC ............... G06F 21/6254; G06F 16/953; G06F 21/6245; G06Q 30/0201; G06Q 40/08; G06Q 50/22
See application file for complete search history.

(56) References Cited

U.S. PATENT DOCUMENTS

| 6,253,203 B1* | 6/2001 | O'Flaherty | G06F 21/6245 707/999.102 |
| 10,721,304 B2* | 7/2020 | Gupta | H04L 67/1097 |
| 2009/0210945 A1 | 8/2009 | Kato | |
| 2009/0241125 A1* | 9/2009 | Sheehan | G06F 40/166 719/315 |

(Continued)

FOREIGN PATENT DOCUMENTS

| JP | 2000-293421 | 10/2000 |
| JP | 2006-189925 | 7/2006 |

(Continued)

OTHER PUBLICATIONS

Bostock et al., "$D^3$ Data-Driven Documents", IEEE Transactions on Visualization and Computer Graphics, vol. 17, Issue: 12, Dec. 2011.*

(Continued)

*Primary Examiner* — Morshed Mehedi
(74) *Attorney, Agent, or Firm* — Fujitsu Patent Center

(57) ABSTRACT

A non-transitory computer-readable recording medium stores therein a program for causing a computer to execute a process that includes: obtaining data in which a value is set to at least a part of one or a plurality of items from a device coupled to the computer via a network; determining a management level to be applied to the data among a plurality of management levels of different information protection measure strengths based on an item name of each of the one or the plurality of items of the data and presence or absence (Continued)

of a setting of a value to each of the one or the plurality of items; and storing the data in a memory in association with management information indicating the management level applied to the data.

15 Claims, 35 Drawing Sheets

(56) References Cited

U.S. PATENT DOCUMENTS

| | | | |
|---|---|---|---|
| 2011/0004943 A1* | 1/2011 | Chaganti | G06F 21/31 |
| | | | 726/30 |
| 2012/0110680 A1* | 5/2012 | Oliver | H04L 63/102 |
| | | | 726/30 |
| 2016/0179869 A1* | 6/2016 | Hutchins | G06F 16/211 |
| | | | 707/703 |
| 2017/0124336 A1* | 5/2017 | Freudiger | H04L 63/105 |
| 2018/0255106 A1* | 9/2018 | Wiesmaier | H04L 63/205 |
| 2019/0050599 A1* | 2/2019 | Canard | H04L 9/0861 |
| 2019/0156060 A1* | 5/2019 | Maier | G06F 21/6254 |
| 2019/0260784 A1* | 8/2019 | Stockdale | H04L 63/14 |

FOREIGN PATENT DOCUMENTS

| | | |
|---|---|---|
| JP | 2017-91515 | 5/2017 |
| JP | 2017-151942 | 8/2017 |
| WO | 2008/001707 A1 | 1/2008 |

OTHER PUBLICATIONS

JPOA—Office Action of Japanese Patent Application No. 2018-174728 dated Apr. 5, 2022, with Machine Translation.

* cited by examiner

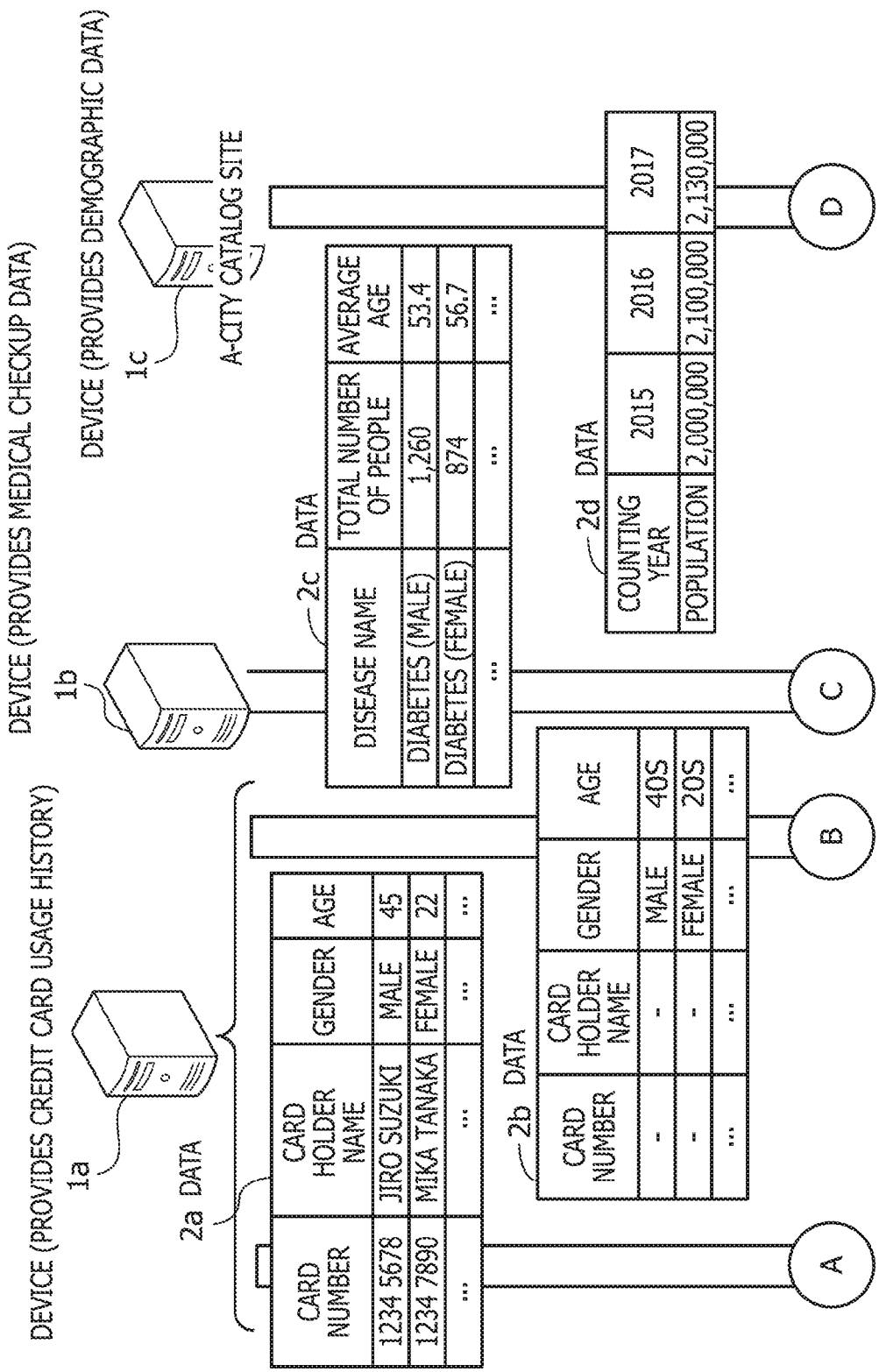

FIG. 6

131 CORPORATE CONTRACT MANAGEMENT TABLE

| No. | CORPORATE ID | CORPORATE NAME | CONTRACT DATE | ADDRESS | CONTACT INFORMATION |
|---|---|---|---|---|---|
| 1 | ABC | ABC INDUSTRY | Dec/01/2017 | OO, AKASHI CITY, HYOGO PREFECTURE | foo@abc.com |
| 2 | AAA | AAA PHARMACEUTICALS | Sep/15/2017 | OO, NAGOYA CITY, AICHI PREFECTURE | bar@aaa.com |
| 3 | XYZ | XYZ RAILWAY | Jul/21/2016 | OO, SHIBUYA WARD, TOKYO | baz@xyz.com |
| ... | ... | ... | ... | ... | ... |

FIG. 7

132 USER MANAGEMENT TABLE

| No. | USER ID | CONTRACT TYPE | CORPORATE ID | ACCOUNT CREATION DATE | EMAIL ADDRESS | LOGIN PASSWORD |
|---|---|---|---|---|---|---|
| 1 | suzuki | INDIVIDUAL | - | Nov/12/2016 | suzuki@hoge.com | ***** |
| 2 | saito | CORPORATE | ABC | Dec/05/2017 | saito@abc.com | ***** |
| 3 | mike | CORPORATE | XYZ | Aug/01/2016 | mike@xyz.com | ***** |
| 4 | watanabe | INDIVIDUAL | - | May/18/2017 | nabe@ggg.com | ***** |
| 5 | taro | CORPORATE | ABC | Jan/04/2018 | taro@abc.com | ***** |
| ... | ... | ... | ... | ... | ... | ... |

FIG. 8

133 OPEN DATA CATALOG SITE MANAGEMENT TABLE

| No. | SITE NAME | OPERATOR | IP ADDRESS |
|---|---|---|---|
| 1 | DATA GO.JP | MINISTRY OF INTERNAL AFFAIRS AND COMMUNICATIONS | aa.aa.aa.aa |
| 2 | TOKYO OPEN DATA CATALOG SITE | TOKYO METROPOLIS | bb.bb.bb.bb |
| 3 | YOKOHAMA OPEN DATA CATALOG | YOKOHAMA CITY | cc.cc.cc.cc |
| 4 | FUJINOKUNI OPEN DATA CATALOG | SHIZUOKA PREFECTURE | dd.dd.dd.dd |
| ... | ... | ... | ... |

FIG. 9

170 COMBINATION PATTERN DICTIONARY STORAGE SECTION

171 COMBINATION PATTERN DICTIONARY

| ITEM NUMBER | ITEM COMBINATION PATTERN |
|---|---|
| 1 | AGE, GENDER |
| 2 | ADDRESS, AGE |
| 3 | ADDRESS, GRADE |
| 4 | SCHOOL NAME, GRADE, HEIGHT |
| 5 | SCHOOL NAME, GRADE, WEIGHT |
| 6 | FAMILY NAME, COMPANY NAME |
| 7 | FAMILY NAME, COMPANY NAME, JOB TITLE |
| 8 | COMPANY NAME, JOB TITLE |
| 9 | NEAREST STATION NAME, AGE, GENDER |
| 10 | PURCHASED PRODUCT NAME, AGE, GENDER |
| ⋮ | ⋮ |

DATA MANAGEMENT INFORMATION STORAGE SECTION

191 DATA MANAGEMENT TABLE

| DATA NAME | DATA STORAGE LOCATION | DATA SIZE | REGISTRATION/ CREATION DATE AND TIME | LAST UPDATE DATE AND TIME | MANAGEMENT LEVEL (METADATA) |
|---|---|---|---|---|---|
| STEP NUMBER DATA_A | PDS | 21MB | 2017.10.15 08:35:23 | 2018.01.07 13:30:46 | PERSONAL INFORMATION |
| STEP NUMBER DATA_B | PDS | 17MB | 2017.12.01 14:42:58 | 2017.12.27 23:00:09 | PERSONAL INFORMATION |
| CREDIT CARD USAGE HISTORY_001 | DB | 400MB | 2017.12.01 04:00:30 | 2017.12.01 04:00:30 | PERSONAL INFORMATION |
| CREDIT CARD USAGE HISTORY_501 | DB | 380MB | 2018.02.20 15:22:01 | 2018.02.20 15:22:01 | ANONYMOUS MANIPULATED INFORMATION |
| MEDICAL CHECKUP DATA_X1 | DB | 150MB | 2017.08.03 11:05:53 | 2017.09.10 14:22:18 | PERSONAL INFORMATION |
| MEDICAL CHECKUP DATA_Y1 | DB | 120MB | 2017.11.01 10:05:47 | 2017.11.01 10:05:47 | ANONYMOUS MANIPULATED INFORMATION |
| SALES COUNTING_S123 | DB | 30MB | 2017.05.01 00:48:12 | 2017.05.01 00:48:12 | STATISTICAL INFORMATION |
| POPULATION CHANGES_M | DB | 55MB | 2016.05.15 13:31:33 | 2018.05.16 11:56:29 | OPEN DATA |

52 CREDIT CARD USAGE HISTORY

| CARD NUMBER | CARD HOLDER NAME | GENDER | AGE | USAGE DATE AND TIME | ESTABLISHMENT USED | AMOUNT |
|---|---|---|---|---|---|---|
| 1234 5678 | JIRO SUZUKI | MALE | 45 | 2017/12/15 18:00 | ○○ DEPARTMENT STORE | 20,000 |
| 1234 7890 | MIKA TANAKA | FEMALE | 22 | 2017/12/20 12:30 | RESTAURANT △△ | 5,400 |
| 2345 3456 | HANAKO SAITO | FEMALE | 66 | 2017/12/22 23:45 | □□ MAIL ORDER | 6,000 |

PERSONAL INFORMATION

PDS
110

53 CREDIT CARD USAGE HISTORY
(ALREADY MANIPULATED FOR ANONYMITY)

| CARD NUMBER | CARD HOLDER NAME | GENDER | AGE | USAGE DATE AND TIME | ESTABLISHMENT USED | AMOUNT |
|---|---|---|---|---|---|---|
| - | - | MALE | 40S | 2017/12/15 18:00 | ○○ DEPARTMENT STORE | 20,000 |
| - | - | FEMALE | 20S | 2017/12/20 12:30 | RESTAURANT △△ | 5,400 |
| - | - | FEMALE | 60S | 2017/12/22 23:45 | □□ MAIL ORDER | 6,000 |

ANONYMOUS MANIPULATED INFORMATION

DB
120

54 MEDICAL CHECKUP DATA

| NAME | GENDER | BIRTH DATE | AGE | HEIGHT | WEIGHT | BLOOD PRESSURE | ... | ANAMNESIS |
|---|---|---|---|---|---|---|---|---|
| JIRO SUZUKI | MALE | 1973/6/11 | 45 | 180 | 65 | 120/80 | ... | DIABETES |
| MIKA TANAKA | FEMALE | 1996/10/2 | 22 | 160 | 40 | 110/70 | ... | NONE |
| HANAKO SAITO | FEMALE | 1952/8/30 | 66 | 155 | 52 | 145/90 | ... | HIGH BLOOD PRESSURE |

PERSONAL INFORMATION

PDS
110

56 MEDICAL CHECKUP DATA
(ALREADY STATISTICALLY PROCESSED)

| DISEASE NAME | TOTAL NUMBER OF PEOPLE | AVERAGE AGE | MINIMUM AGE | MAXIMUM AGE |
|---|---|---|---|---|
| DIABETES (MALE) | 1,260 | 53.4 | 31 | 89 |
| DIABETES (FEMALE) | 874 | 56.7 | 40 | 96 |
| HIGH BLOOD PRESSURE (MALE) | 4,529 | 50.2 | 35 | 97 |
| HIGH BLOOD PRESSURE (FEMALE) | 3,881 | 55.5 | 37 | 98 |

STATISTICAL INFORMATION

| 57 OPERATION LOG | | | | | | | |
|---|---|---|---|---|---|---|---|
| FACILITIES \ DATE | 12/25 | 12/26 | 12/27 | 12/28 | 12/29 | 12/30 | 12/31 |
| ELECTRICITY | OPERATIONAL | OPERATIONAL | OPERATIONAL | OPERATIONAL | OPERATIONAL | STOPPED | OPERATIONAL |
| MUNICIPAL WATER | OPERATIONAL | OPERATIONAL | OPERATIONAL | OPERATIONAL | OPERATIONAL | OPERATIONAL | OPERATIONAL |
| INDUSTRIAL WATER | OPERATIONAL | OPERATIONAL | OPERATIONAL | OPERATIONAL | STOPPED | STOPPED | STOPPED |
| COOLING WATER | OPERATIONAL | OPERATIONAL | OPERATIONAL | OPERATIONAL | STOPPED | STOPPED | STOPPED |

NONSTATISTICAL INFORMATION NOT INCLUDING PERSONAL INFORMATION

120 DB

| ESTABLISHMENT NAME / COUNTING YEAR | TOTAL NUMBER OF VISITORS (NOVEMBER) | TOTAL SALES (NOVEMBER) | TOTAL NUMBER OF VISITORS (DECEMBER) | TOTAL SALES (DECEMBER) |
|---|---|---|---|---|
| ○○ SHOP | 3,678 | 500,000 YEN | 5,431 | 700,000 YEN |
| △△ CHINESE NOODLES | 5,820 | 850,000 YEN | 4,218 | 780,000 YEN |
| □□ STORE | 12,345 | 1,000,000 YEN | 9,873 | 1,200,000 YEN |

58 AGGREGATION

STATISTICAL INFORMATION

DB 120

FIG. 22A
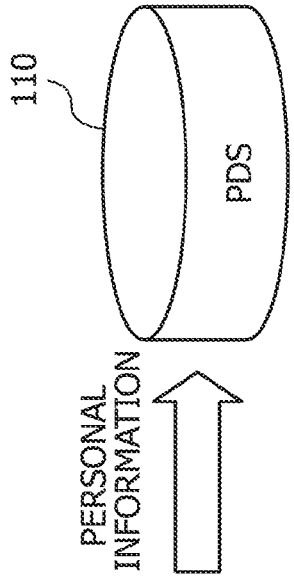
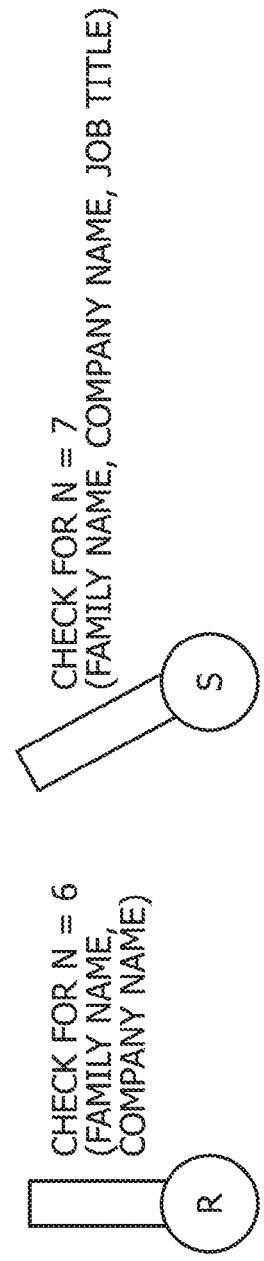

FIG. 23

70 SEARCH SCREEN

SEARCH KEYWORD: |PURCHASE BEHAVIOR DATA| ~71

SEARCH RESULT: ~72
  (1) PERSONAL INFORMATION
      MEAL LOG OF A (LUNCH, BEVERAGES, AND SO ON) ○ MB
      MEAL LOG OF B (LUNCH, BEVERAGES, AND SO ON) ○ MB (2) ANONYMOUS MANIPULATED INFORMATION
      USAGE HISTORY DATA OF CREDIT CARD M ○ GB
      BOARDING AND ALIGHTING DATA OF N RAILWAY × IC CARD
      SHOPPING HISTORY ○ GB (3) STATISTICAL INFORMATION
      CLOTHING MARKET SCALE DATA ○ MB
      FOOD MARKET SCALE DATA ○ MB (4) OPEN DATA
      DATA ON CHANGES IN DISPOSABLE INCOMES IN KANAGAWA
      PREFECTURE ○ MB

FIG. 24

80 DATA MANIPULATION REQUEST SCREEN

DATA DETAILED INFORMATION
DATA NAME: MEAL LOG OF A (LUNCH, BEVERAGES, AND SO ON)
DATA SIZE: O MB
MANAGEMENT LEVEL: PERSONAL INFORMATION

DATA OBTAINMENT/MANIPULATION     86

81  DOWNLOAD DATA →     ☐ AGREE TO STRICTLY MANAGE OBTAINED DATA AS PERSONAL INFORMATION.

82  MANIPULATE DATA FOR ANONYMITY ✂     DATA IS MANIPULATED INTO ANONYMOUS INFORMATION FROM WHICH IT IS IMPOSSIBLE TO IDENTIFY INDIVIDUALS. MANAGEMENT OF ANONYMOUS INFORMATION AS ANONYMOUS MANIPULATED INFORMATION IS DESIRED.

83  MANIPULATE DATA INTO STATISTICAL INFORMATION ✂     DATA IS MANIPULATED INTO STATISTICAL INFORMATION. DATA BECOMES USABLE AND DISTRIBUTABLE AS STATISTICAL DATA.

84  COMBINE WITH OTHER DATA ✂     NEW DATA IS GENERATED BY COMBINATION WITH OTHER DATA. STRICTEST MANAGEMENT LEVEL OF DATA USED FOR COMBINATION IS APPLIED AS MANAGEMENT LEVEL OF DATA.

85  RETURN TO DATA SEARCH SCREEN ↩

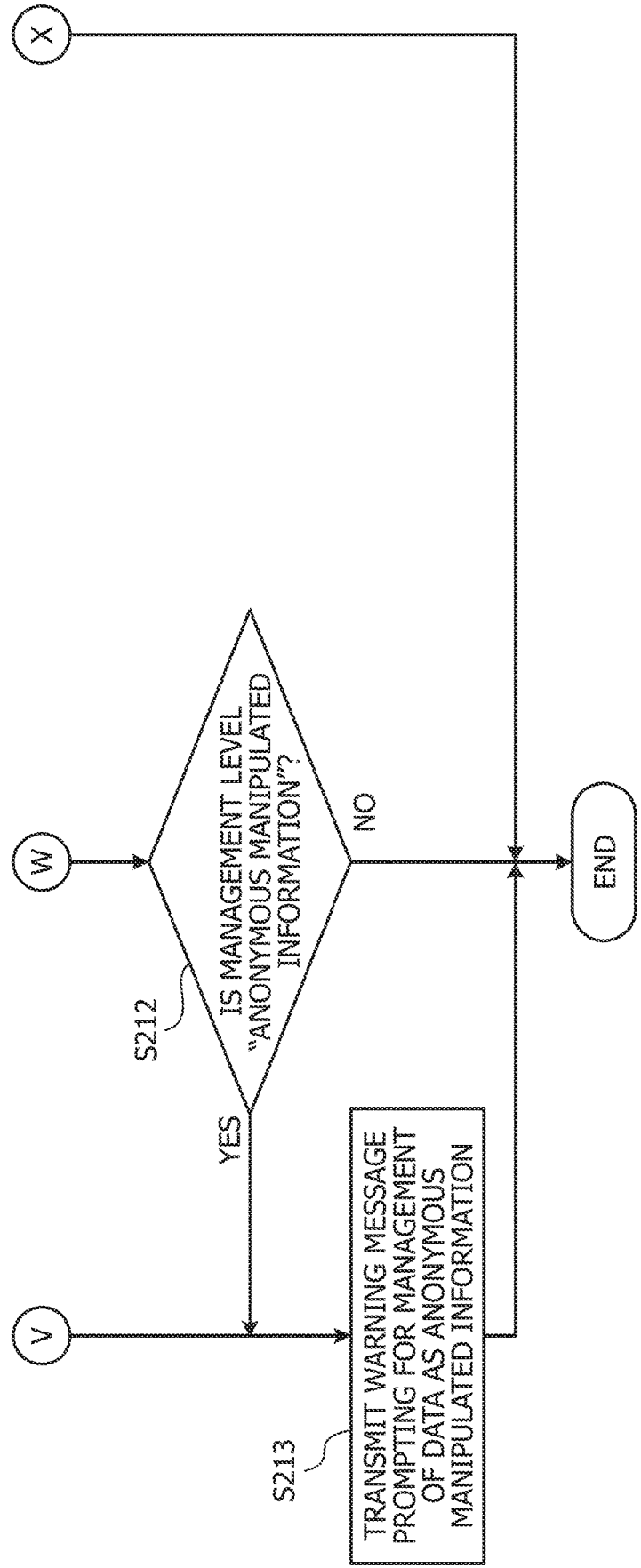

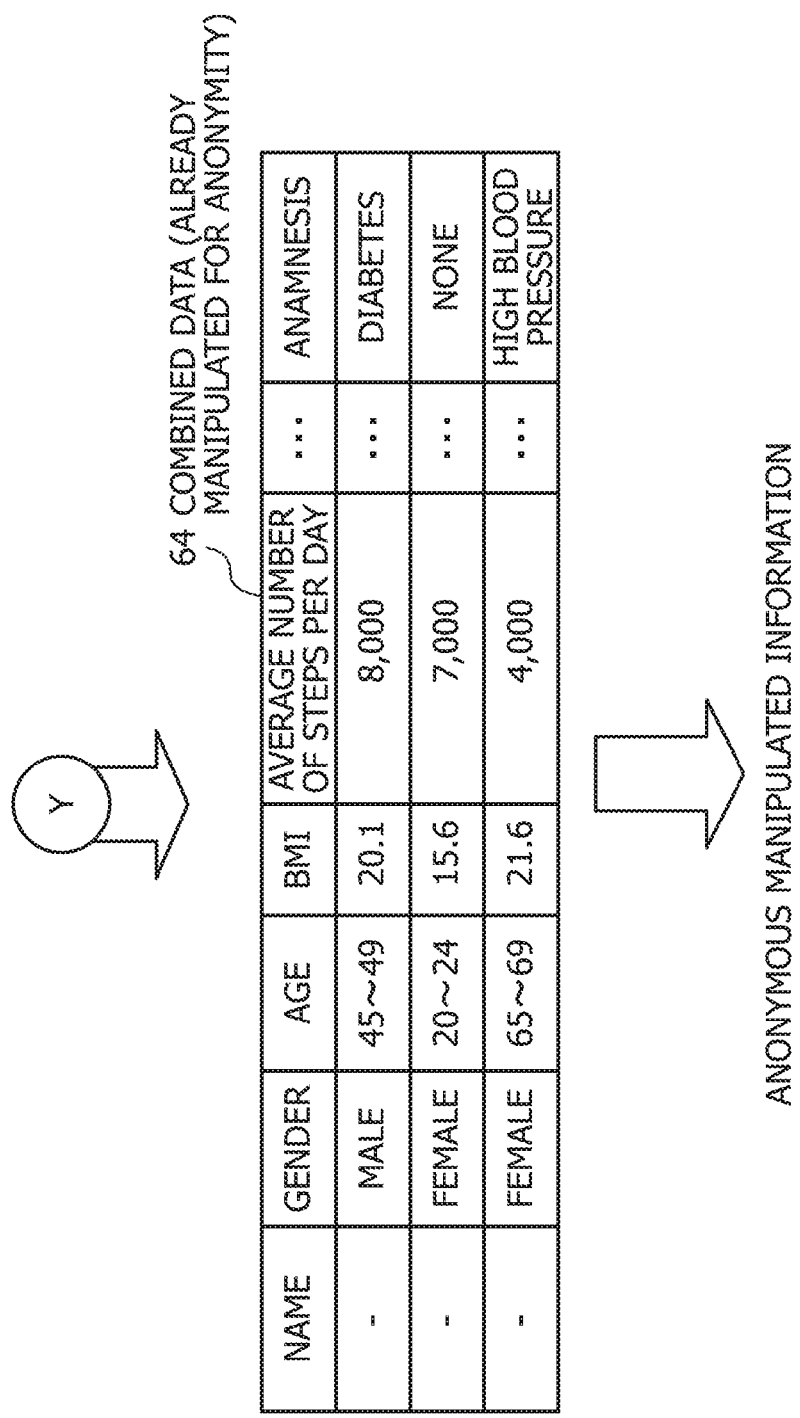

DATA MANAGEMENT LEVEL DETERMINING METHOD

CROSS-REFERENCE TO RELATED APPLICATION

This application is based upon and claims the benefit of priority of the prior Japanese Patent Application No. 2018-174728, filed on Sep. 19, 2018, the entire contents of which are incorporated herein by reference.

FIELD

The embodiments discussed herein are related to a data management level determining method.

BACKGROUND

Computer systems of various organizations such as companies or the like may handle personal information. Many countries prohibit, by law, usage of personal information for purposes other than an original purpose without an agreement of a person in question. Incidentally, statistical information calculated from personal information can be used for a wider range of purposes.

In addition, personal information may be used after being subjected to anonymity manipulation. The anonymity manipulation modifies the personal information so as to make it impossible to identify an individual. The anonymity manipulation, for example, deletes information regarding the name and birth date of the provider from the personal information. The information after the anonymity manipulation (anonymous manipulated information) can be used for various purposes without an agreement of the person in question.

A large amount of data on a network, the data including personal information, may be used effectively via a data distribution base. In the data distribution base, for example, a server collects data via the network, and statistical information obtained from a part of the collected data or the collected data is provided to users. In this case, the data collected by the server via the network includes, in addition to personal information and anonymous manipulated information, statistical information, open data, and the like. The open data is data disclosed to the public.

The server collecting data from the network manages the handled data by carrying out an information protection measure at an appropriate level according to the kind of the data. The server particularly strictly manages personal information by, for example, limiting users who can make access thereto. In addition, the server manages anonymous manipulated information so as not to use the anonymous manipulated information in a manner prohibited by a law, for example. Further, the server manages statistical information so as not to disclose the statistical information to the general public, for example. Open data is disclosed data, and therefore the server does not perform special management of the open data. Thus, a plurality of management levels of different protection strengths are prepared as data protecting measures. The server protects data whose kinds are known at appropriate management levels corresponding to the kinds of the data.

As a technology related to the handling of information to be protected, there is, for example, a privacy protecting device that protects provided information and increases services obtained by providing information. There is also a computer-implemented system that automatically identifies attributes for anonymization. Further, a method is considered which stores data in a database having a function of controlling a privacy protecting function, and extracts the data from the database.

The related technologies are disclosed in Japanese Laid-open Patent Publication No. 2017-151942, Japanese Laid-open Patent Publication No. 2017-91515, and Japanese Laid-open Patent Publication No. 2000-293421.

SUMMARY

According to an aspect of the embodiments, a non-transitory computer-readable recording medium stores therein a program for causing a computer to execute a process that includes: obtaining data in which a value is set to at least a part of one or a plurality of items from a device coupled to the computer via a network; determining a management level to be applied to the data among a plurality of management levels of different information protection measure strengths based on an item name of each of the one or the plurality of items of the data and presence or absence of a setting of a value to each of the one or the plurality of items; and storing the data in a memory in association with management information indicating the management level applied to the data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A to 1C depict a diagram illustrating an example of a data management level determining method according to a first embodiment;

FIG. 6 is a diagram illustrating an example of a corporate contract management table;

FIG. 7 is a diagram illustrating an example of a user management table;

FIG. 8 is a diagram illustrating an example of an open data catalog site management table;

FIG. 9 is a diagram illustrating an example of a combination pattern dictionary;

FIG. 10 is a diagram illustrating an example of data management information within a data management information storage section;

FIG. 19 is a diagram illustrating a seventh example of determination of a management level;

FIGS. 22A and 22B depict a diagram illustrating a 10th example of determination of a management level;

FIG. 23 is a diagram illustrating an example of a search screen;

FIG. 24 is a diagram illustrating an example of a data manipulation request screen;

FIGS. 25A to 25C depict a flowchart illustrating an example of a procedure of manipulated data management level determination processing;

FIGS. 26A and 26B depict a diagram illustrating a first example of a manipulated data management level determination processing.

DESCRIPTION OF EMBODIMENTS

For example, data collected by the server of the data distribution base is often unknown as to a management level of information protection to be performed. For some of the collected data, providing sources of the data indicate kinds such as personal information and the like. However, such kinds are not indicated for all of the data. Furthermore, as for data obtained from original data by applying some manipulation, a manipulator himself/herself may not grasp what kind of data the data after the manipulation is. Therefore, in a case where a large amount of data is collected via a network, it is difficult to determine, for the collected data, management levels for performing appropriate information protection according to the kinds of the collected data.

Present embodiments will hereinafter be described with reference to the drawings. It is to be noted that each embodiment may be carried out in a state in which a plurality of embodiments are combined with each other within a scope where no inconsistency arises.

First Embodiment

Figure 1B:
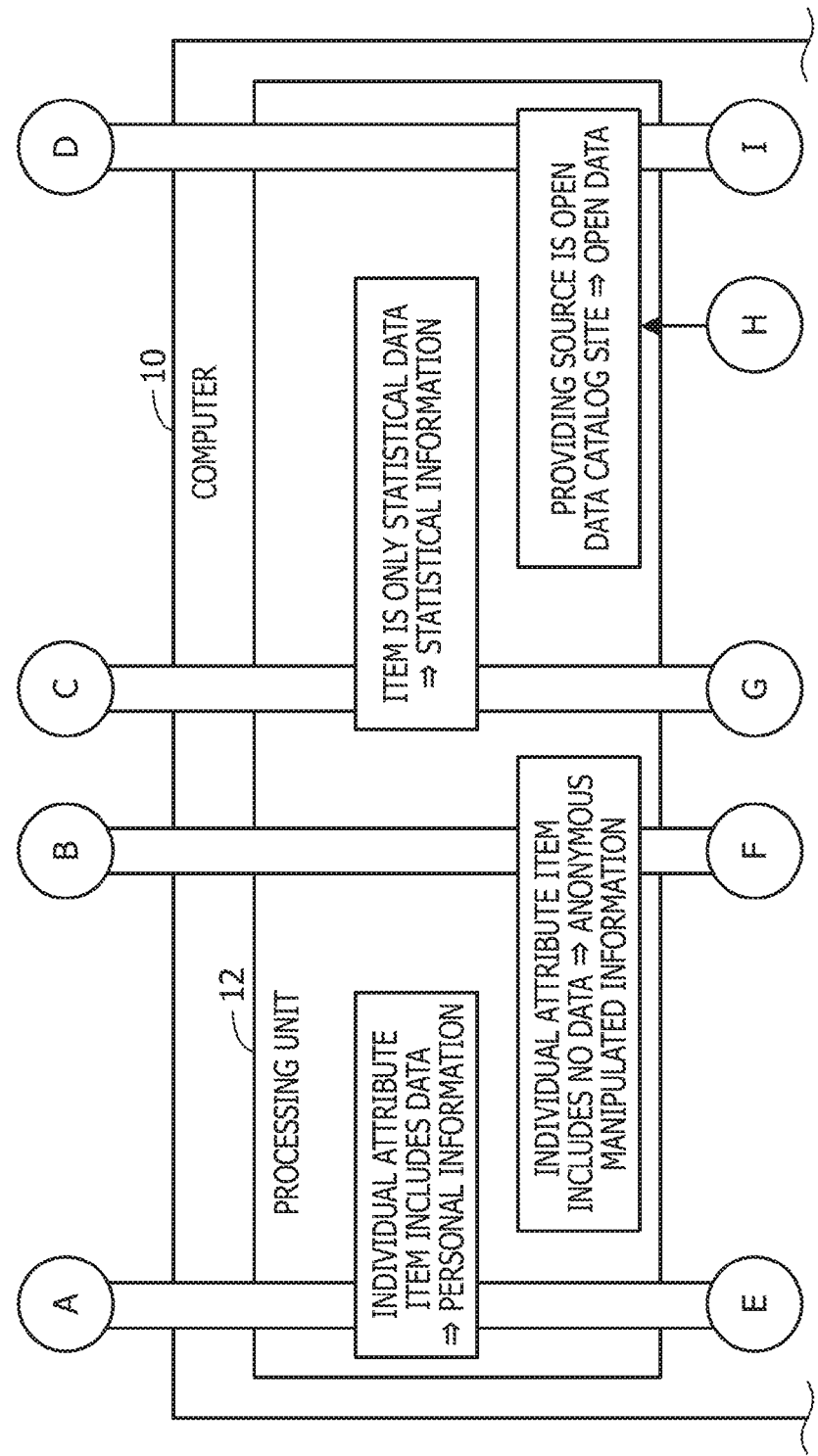
Figure 1C:
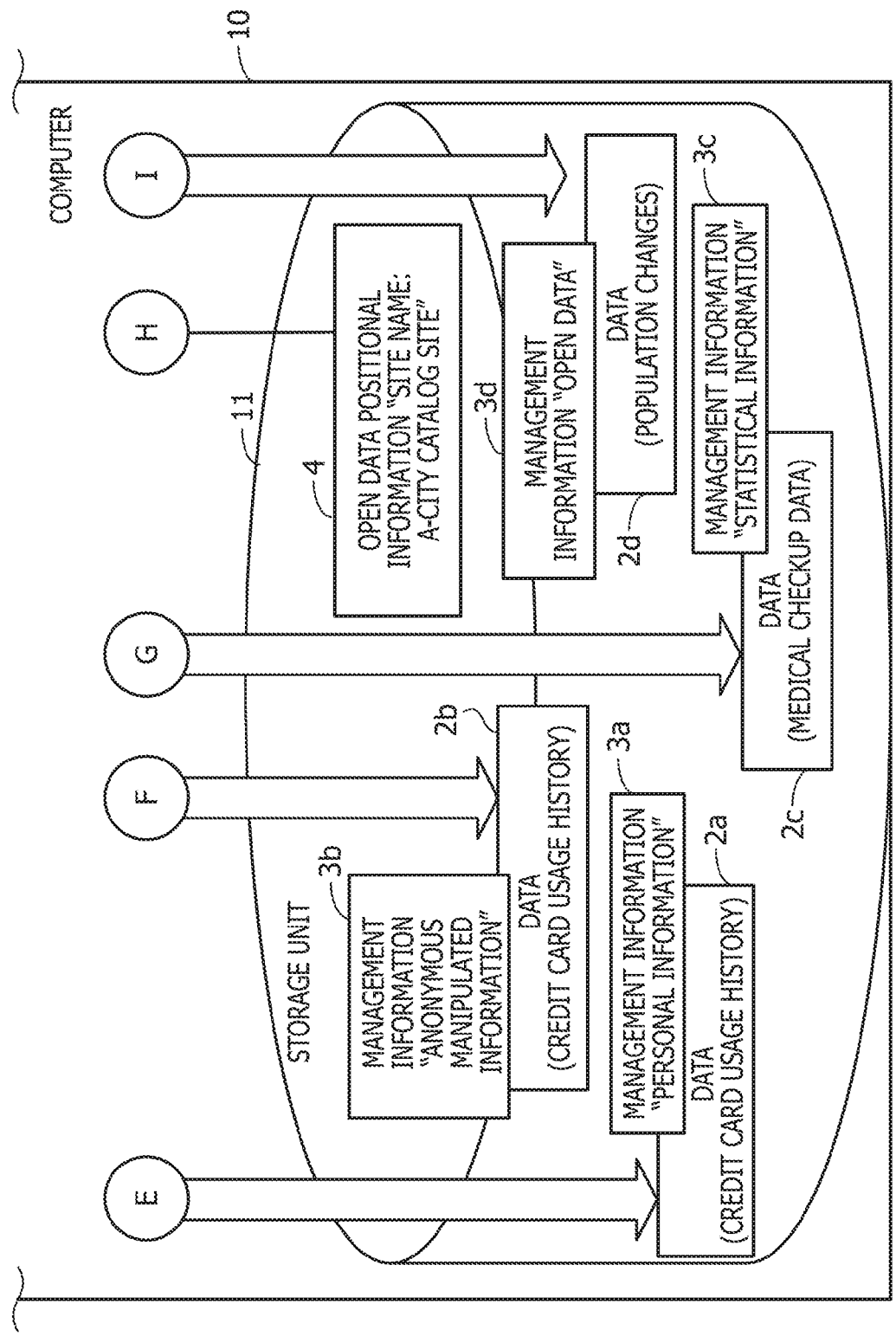

FIGS. 1A to 1C depict a diagram illustrating an example of a data management level determining method according to a first embodiment. FIGS. 1A to 1C illustrate an example of a case where the data management level determining method is performed by a computer 10. The computer 10 may perform the data management level determining method by executing a data management level determining program describing a processing procedure of the data management level determining method, for example.

The computer 10 includes a storage unit 11 and a processing unit 12 in order to perform the data management level determining method. The storage unit 11 is, for example, a memory possessed by the computer 10. The memory may include a storage device. The processing unit 12 is, for example, a processor or an arithmetic circuit possessed by the computer 10.

The processing unit 12 of the computer 10 performs the following processing based on the data management level determining program.

The processing unit 12 first obtains data 2a to 2d in which a value is set to at least a part of one or a plurality of items from devices 1a to 1c coupled via a network. The processing unit 12 next determines a management level to be applied to the obtained data 2a to 2d among a plurality of management levels based on an item name of each of the one or plurality of items of the obtained data 2a to 2d and presence or absence of a setting of a value to each of the one or plurality of items.

Information protection measure strength differs between the plurality of management levels. The management level of a highest information protection measure strength is a management level for personal information. Data managed at the management level for personal information is strictly managed so that the data does not leak to the outside against the will of a provider of the data. The management level of a next highest information protection measure strength is, for example, a management level for anonymous manipulated information. The anonymous manipulated information is data obtained by manipulating personal information so as to make it impossible to identify individuals. The usage purpose of the data managed at the management level for the anonymous manipulated information is, for example, managed such that the data is not used for purposes other than a purpose determined in advance by a law. The management level of a next highest information protection measure strength is, for example, a management level for statistical information. Data managed at the management level for statistical information is disclosed within a certain limited scope, for example, disclosed only to people registered as data users in advance. The management level of a lowest information protection measure strength is, for example, a management level for open data. Data managed at the management level for open data is, for example, disclosed to all users who can access the computer 10 via the network.

Incidentally, it is possible to set also a management level for data other than "personal information," "anonymous manipulated information," "statistical information," and "open data." For example, data that does not include information capable of identifying individuals but does not correspond to any of "anonymous manipulated information," "statistical information," and "open data" may be set as "nonstatistical information not including personal information," and a management level for such data may be set.

After the management levels of the obtained data 2a to 2d are determined, the data 2a to 2d is stored in the storage unit 11 in association with management information 3a to 3d indicating the management levels applied to the data.

Thus, the management levels of the obtained data 2a to 2d are automatically determined, and the data 2a to 2d is retained in association with the management information 3a to 3d indicating the management levels. Because the data 2a to 2d is associated with the management information 3a to 3d, when the processing unit 12 uses the data 2a to 2d, the processing unit 12 may recognize the management levels by referring to the associated management information 3a to 3d, and use the data under the information protection measures in accordance with the management levels.

The processing unit 12 determines the management levels of the data 2a to 2d as follows, for example.

When the item name of each of one or a plurality of items includes the item name of an individual attribute item to which to set a value capable of identifying an individual, and a value is set to the individual attribute item, for example, the processing unit 12 determines that the management level of the data 2a to 2d is the management level for personal information. In the example of FIGS. 1A to 1C, the data 2a indicating a credit card usage history is obtained from the device 1a, and the data 2a includes an item name "card holder name" of an individual attribute item. Furthermore, the name of a card holder is set as a value in an item "card holder name" of the data 2a. Therefore, the processing unit 12 determines that the management level to be applied to the data 2a is the management level for personal information, and stores the data 2a in the storage unit 11 in association with the management information 3a indicating the management level "personal information."

In addition, when the item name of each of one or a plurality of items includes the item name of an individual attribute item, and no value is set to the individual attribute item, for example, the processing unit 12 determines that the management level of the data 2a to 2d is the management level for anonymous manipulated information. In the example of FIGS. 1A to 1C, the data 2b indicating a credit card usage history is obtained from the device 1a. The data 2b includes the item name "card holder name" of an individual attribute item, but no value is set to an item "card holder name." Therefore, the processing unit 12 determines that the management level to be applied to the data 2b is the management level for anonymous manipulated information, and stores the data 2b in the storage unit 11 in association with the management information 3b indicating the management level "anonymous manipulated information."

In addition, there are cases where the data 2a to 2d include a plurality of records, and one or a plurality of items include a first item and a second item. In this case, the processing unit 12 determines whether or not sets of a value of the first item and a value of the second item within a same record include a set present in only a given number of records or less among the plurality of records. When there is a set of values present in only a given number of records or less, the processing unit 12 determines that the management level of the data 2a to 2d is the management level for personal information.

In addition, when one or a plurality of items are an item indicating a statistical target or an item indicating the name of a statistical value, the processing unit 12 determines that the management level of the data 2a to 2d is the management level for statistical information. In the example of FIGS. 1A to 1C, items included in the data 2c obtained from the device 1b are only an item indicating the name "disease name" of a statistical target and items indicating names "total number of people" and "average age" of statistical values of the statistical target. Therefore, the processing unit 12 determines that the management level to be applied to the data 2c is the management level for statistical information, and stores the data 2c in the storage unit 11 in association with the management information 3c indicating the management level "statistical information."

The computer 10 may store open data positional information 4 (for example, a site name and a network address) indicating a storage location of open data usable without limitation in the storage unit 11 in advance. In this case, the processing unit 12 compares the open data positional information 4 with positional information of sources from which the data 2a to 2d is obtained on the network. When the positional information of the sources from which the data 2a to 2d is obtained is included in the open data storage location, the processing unit 12 determines that the management level of the data 2a to 2d is the management level for open data. In the example of FIGS. 1A to 1C, the position of a site name "A-city catalog site," for example, is illustrated as the open data positional information 4. A storage area of content within the device 1c is located at the position corresponding to the "A-city catalog site." When the processing unit 12 obtains the data 2d from the position corresponding to the "A-city catalog site," the processing unit 12 recognizes that the data 2d is data obtained from the "A-city catalog site" based on the open data positional information 4. Then, the processing unit 12 determines that the management level to be applied to the data 2d is the management level for open data, and stores the data 2d in the storage unit 11 in association with the management information 3d indicating the management level "open data."

Incidentally, when the processing unit 12 provides the data 2a to 2d stored in the storage unit 11, the processing unit 12 may specify the management levels applied to the data 2a to 2d based on the management information 3a to 3d. For example, the processing unit 12 performs a data search in the storage unit 11 in response to a data search request specifying a search condition. The processing unit 12 then outputs a search result indicating the name and management level of pertinent data matching the search condition.

In addition, when the processing unit 12 manipulates the data 2a to 2d stored in the storage unit 11 and provides the manipulated data after the manipulation, the processing unit 12 may specify a management level to be applied to the manipulated data. For example, in response to a data manipulation request requesting manipulation of some piece of data stored in the storage unit 11, the processing unit 12 manipulates the data. The processing unit 12 determines the management level of the manipulated data based on the management level of the data as a manipulation source and the content of the manipulation. For example, the processing unit 12 sets, as the management level of the manipulated data, the management level of a highest information protection measure strength among the management levels of the data as the manipulation source. The processing unit 12 then outputs information indicating the management level of the manipulated data and the manipulated data.

Incidentally, when the processing unit 12 manipulates data managed as personal information, the processing unit 12 may generate the manipulated data using only items not leading to the identification of individuals among the items of the data as the manipulation source. In this case, the protection strength for the manipulated data may be made lower than the management level for personal information. For example, when the management level of the data as the manipulation source is the management level for personal information, and individual attribute items to which values capable of identifying individuals are set are all deleted from the data, the processing unit 12 sets the management level of the manipulated data to another management level of a lower protection strength than that of personal information.

Thus, according to the first embodiment, the computer 10 may appropriately determine a management level to be applied to obtained data from among the plurality of management levels. As a result, even when a large amount of data whose management levels at which to manage the data are unknown is collected via the network, an appropriate information protection measure corresponding to the content of each piece of data may be applied to each piece of data.

Further, when the computer 10 outputs the result of search of the data 2a to 2d stored in the storage unit 11, the computer 10 includes information indicating the management level of the data matching the search condition in the search result. The computer 10 may thereby notify the management level of the data to a data user. For example, the computer 10 displays a warning or a message calling attention according to the management level. The computer 10 may thereby prompt the data user to perform appropriate management of the data.

Furthermore, also when the computer 10 manipulates collected data and provides the manipulated data, the computer 10 automatically determines the management level of the manipulated data. The computer 10 may therefore prompt also a user of the manipulated data to perform appropriate management of the manipulated data.

Second Embodiment

A second embodiment will next be described.

Figure 2:
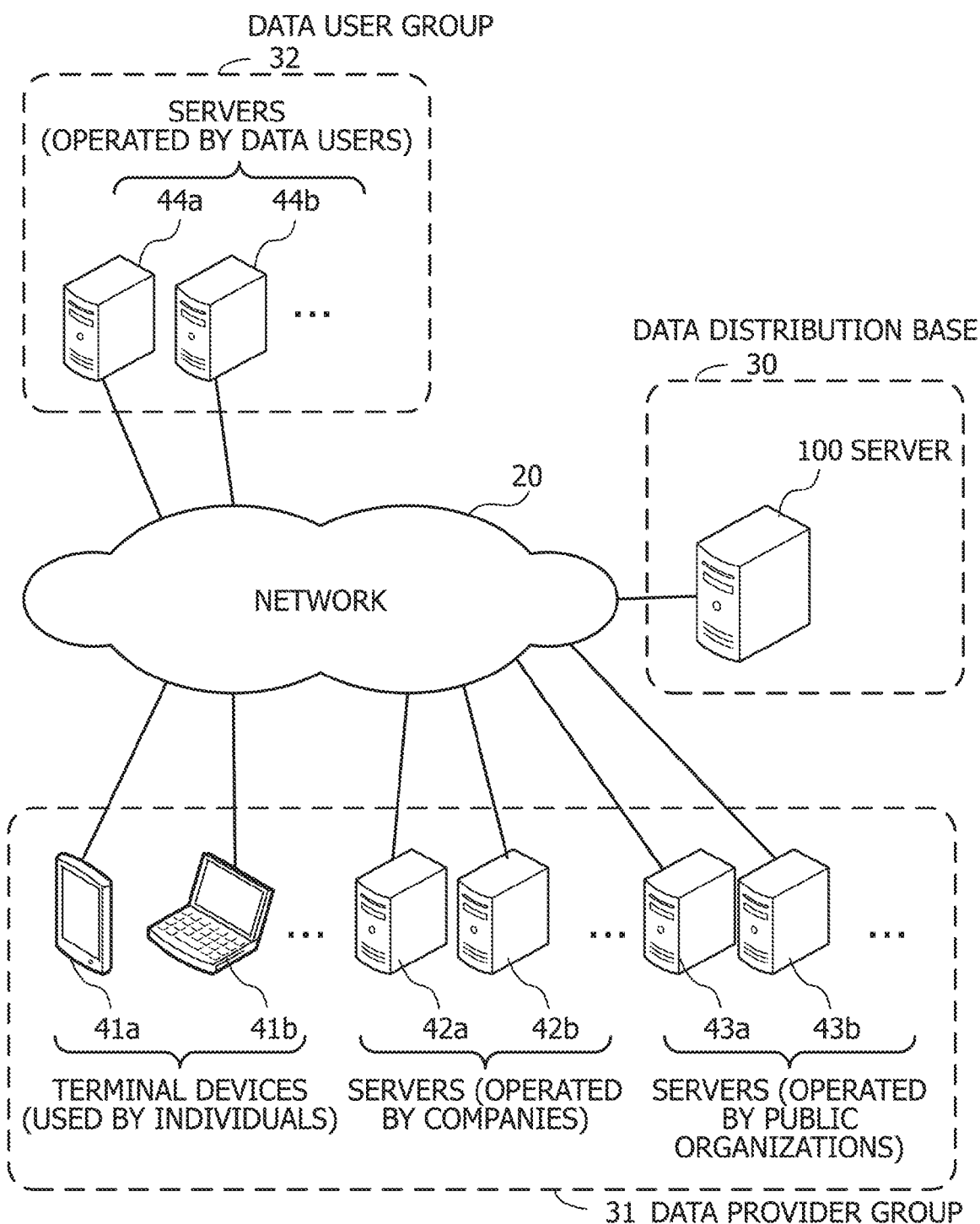
FIG. 2 is a diagram illustrating an example of a system according to a second embodiment.

FIG. 2 is a diagram illustrating an example of a system according to the second embodiment. A data distribution base 30 is provided with a server 100 that collects data and provides the collected data. The server 100 collects data from devices used by a data provider group 31 including a plurality of data providers via a network 20.

The data providers include individuals, companies, public organizations, and the like. In a case where the data providers are individuals, the server 100, for example, collects data from terminal devices 41a, 41b, . . . used by the individuals. In addition, in a case where the data providers are companies, the server 100, for example, collects data from servers 42a, 42b, . . . operated by the companies. Further, in a case where the data providers are public organizations such as a country or local public bodies or the like, the server 100 collects data from servers 43a, 43b, . . . operated by the public organizations, for example.

The server 100 of the data distribution base 30 determines kinds of the collected data, and appropriately manages the collected data according to the kinds. The server 100 then provides the collected data or data obtained by manipulating the collected data in response to a request from a device used by a data user group 32 including a plurality of data users. For example, the server 100 searches for data in response to a search request from servers 44a, 44b, . . . operated by the data users, and transmits a search result. In addition, when the server 100 receives a data obtaining request involving manipulation of data from the servers 44a, 44b, . . . , the server 100 manipulates the data according to the data obtaining request, and transmits the manipulated data.

Incidentally, when the server 100 transmits the search result, the server 100 includes, in the search result, information indicating a management level corresponding to the kind of the data hit in the search. In addition, when the server 100 provides the data after the manipulation, the server 100 determines a management level corresponding to the type of the data after the manipulation, and adds information indicating the determined management level to the data after the manipulation. Thus, the server 100 automatically determines a management level for protecting data, and appropriately manages the data.

In the following description, the type of management target data will be set as the name of a management level applied to the data of the type in question. For example, the management level for personal information will be set as a management level "personal information." The management level for anonymous manipulated information will be set as a management level "anonymous manipulated information." The management level for statistical information will be set as a management level "statistical information." The management level for open data will be set as a management level "open data." The management level for data that does not include personal information and is neither statistical information nor open data will be set as a management level "nonstatistical information not including personal information."

Figure 3:
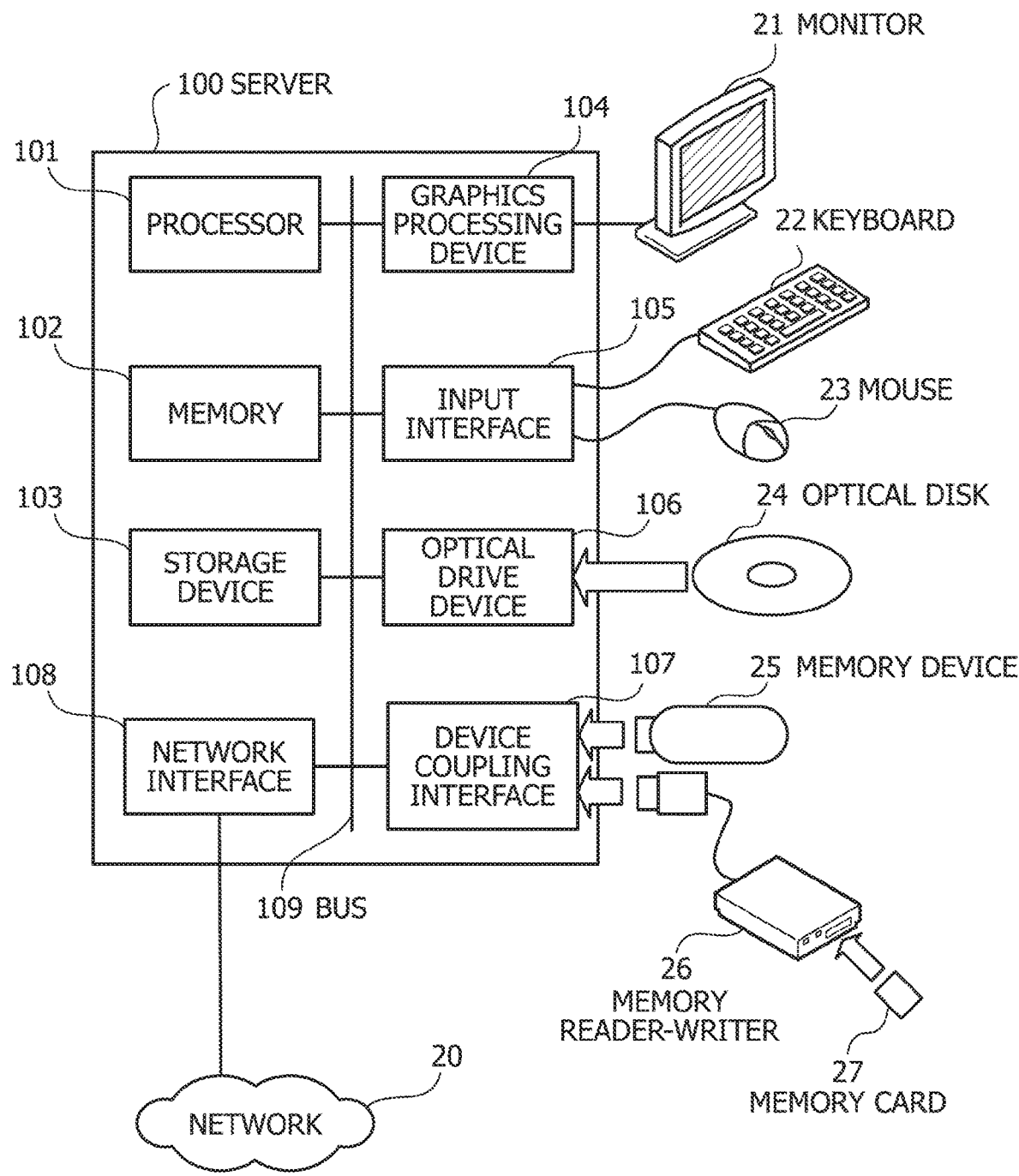
FIG. 3 is a diagram illustrating an example of a configuration of hardware of a server.

FIG. 3 is a diagram illustrating an example of a configuration of hardware of a server. The whole apparatus of a server 100 is controlled by a processor 101. The processor 101 is coupled with a memory 102 and a plurality of peripheral devices via a bus 109. The processor 101 may be a multiprocessor. The processor 101 is, for example, a central processing unit (CPU), a micro processing unit (MPU), or a digital signal processor (DSP). At least a part of functions that the processor 101 implements by executing a program may be implemented by an electronic circuit such as an application specific integrated circuit (ASIC), a programmable logic device (PLD), or the like.

The memory 102 is used as a main storage device of the server 100. The memory 102 temporarily stores at least a part of an operating system (OS) program and an application program executed by the processor 101. In addition, the memory 102 stores various kinds of data used for processing by the processor 101. A volatile semiconductor storage device such as a random access memory (RAM) or the like is used as the memory 102.

Peripheral devices coupled to the bus 109 include a storage device 103, a graphics processing device 104, an input interface 105, an optical drive device 106, a device coupling interface 107, and a network interface 108.

The storage device 103 electrically or magnetically writes and reads data to and from an internal recording medium. The storage device 103 is used as an auxiliary storage device of the computer. The storage device 103 stores the OS program, application programs, and various kinds of data. Incidentally, a hard disk drive (HDD) or a solid state drive (SSD), for example, may be used as the storage device 103.

The graphics processing device 104 is coupled with a monitor 21. The graphics processing device 104 displays an image on a screen of the monitor 21 according to an instruction from the processor 101. As the monitor 21, there is a display device using organic electro luminescence (EL), a liquid crystal display device, or the like.

The input interface 105 is coupled with a keyboard 22 and a mouse 23. The input interface 105 transmits signals sent from the keyboard 22 and the mouse 23 to the processor 101. Incidentally, the mouse 23 is an example of a pointing device, and other pointing devices may also be used. The other pointing devices include a touch panel, a tablet, a touch pad, a trackball, and the like.

The optical drive device 106 reads data recorded on an optical disk 24 by using laser light or the like. The optical disk 24 is a portable recording medium on which data is recorded so as to be readable by the reflection of light. As the optical disk 24, there are a digital versatile disc (DVD), a DVD-RAM, a compact disc read only memory (CD-ROM), a CD-recordable (R)/rewritable (RW), and the like.

The device coupling interface 107 is a communication interface for coupling peripheral devices to the server 100. For example, the device coupling interface 107 may be coupled with a memory device 25 and a memory reader-writer 26. The memory device 25 is a recording medium having a function of communicating with the device coupling interface 107. The memory reader-writer 26 is a device that writes data to a memory card 27 or reads data from the memory card 27. The memory card 27 is a card type recording medium.

The network interface 108 is coupled to the network 20. The network interface 108 transmits and receives data to and from another computer or a communicating device via the network 20.

The server 100 may implement processing functions of the second embodiment by the hardware configuration as described above. Incidentally, the computer 10 illustrated in the first embodiment may also be implemented by hardware similar to that of the server 100 illustrated in FIG. 3.

The server 100 implements the processing functions of the second embodiment by executing a program recorded on a computer readable recording medium, for example. A program describing processing contents to be executed by the server 100 may be recorded on various recording media. For example, the program to be executed by the server 100 may be stored in the storage device 103. The processor 101 loads at least a part of the program within the storage device 103 into the memory 102, and executes the program. In addition, the program to be executed by the server 100 may also be recorded on a portable recording medium such as the optical disk 24, the memory device 25, the memory card 27, or the like. The program stored on the portable recording medium becomes executable after being installed on the storage device 103 under control of the processor 101, for example. The processor 101 may also directly read and execute the program from the portable recording medium.

Figure 4A:
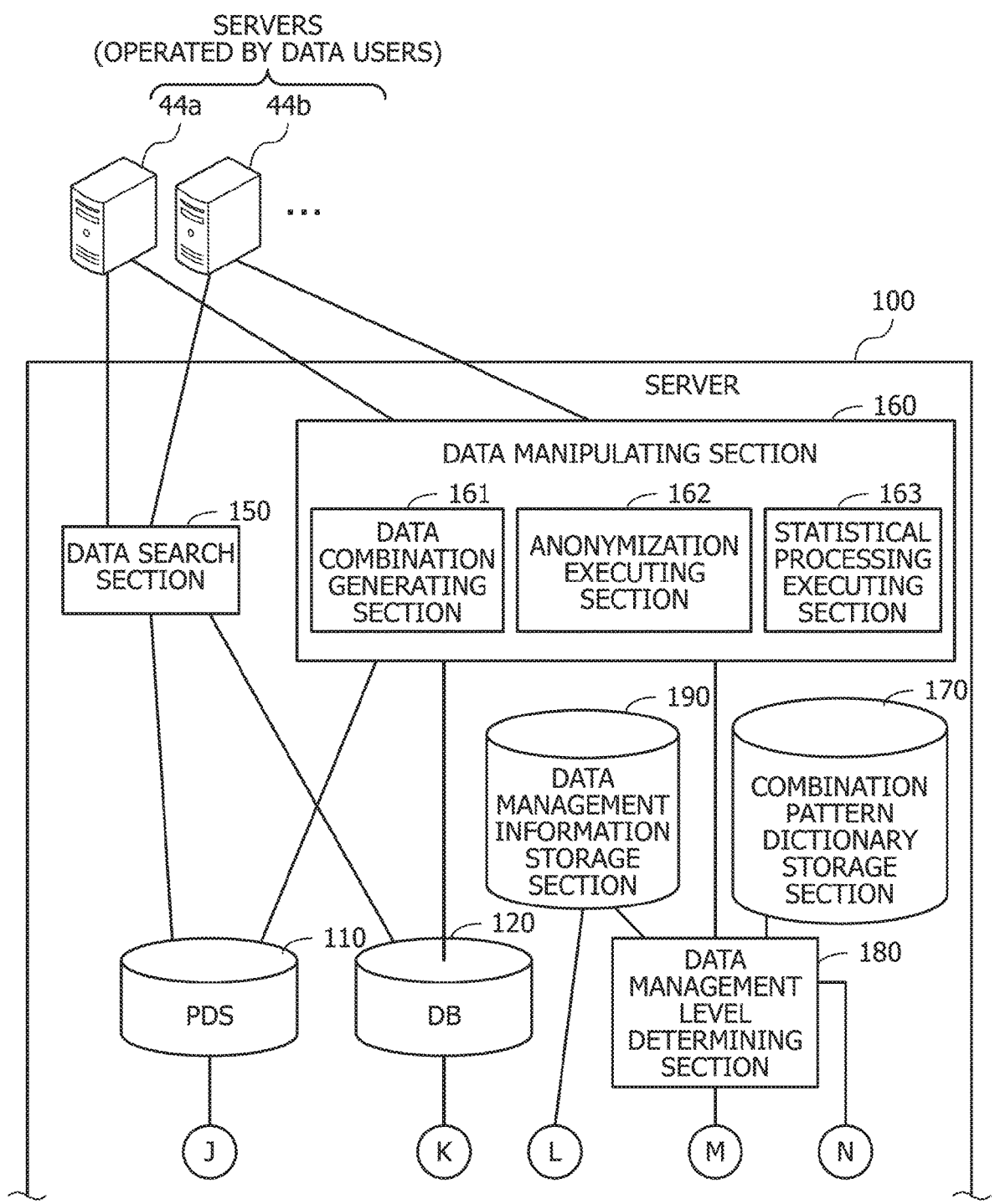
FIGS. 4A and 4B depict a block diagram illustrating functions implemented by a server of a data distribution base.
Figure 4B:
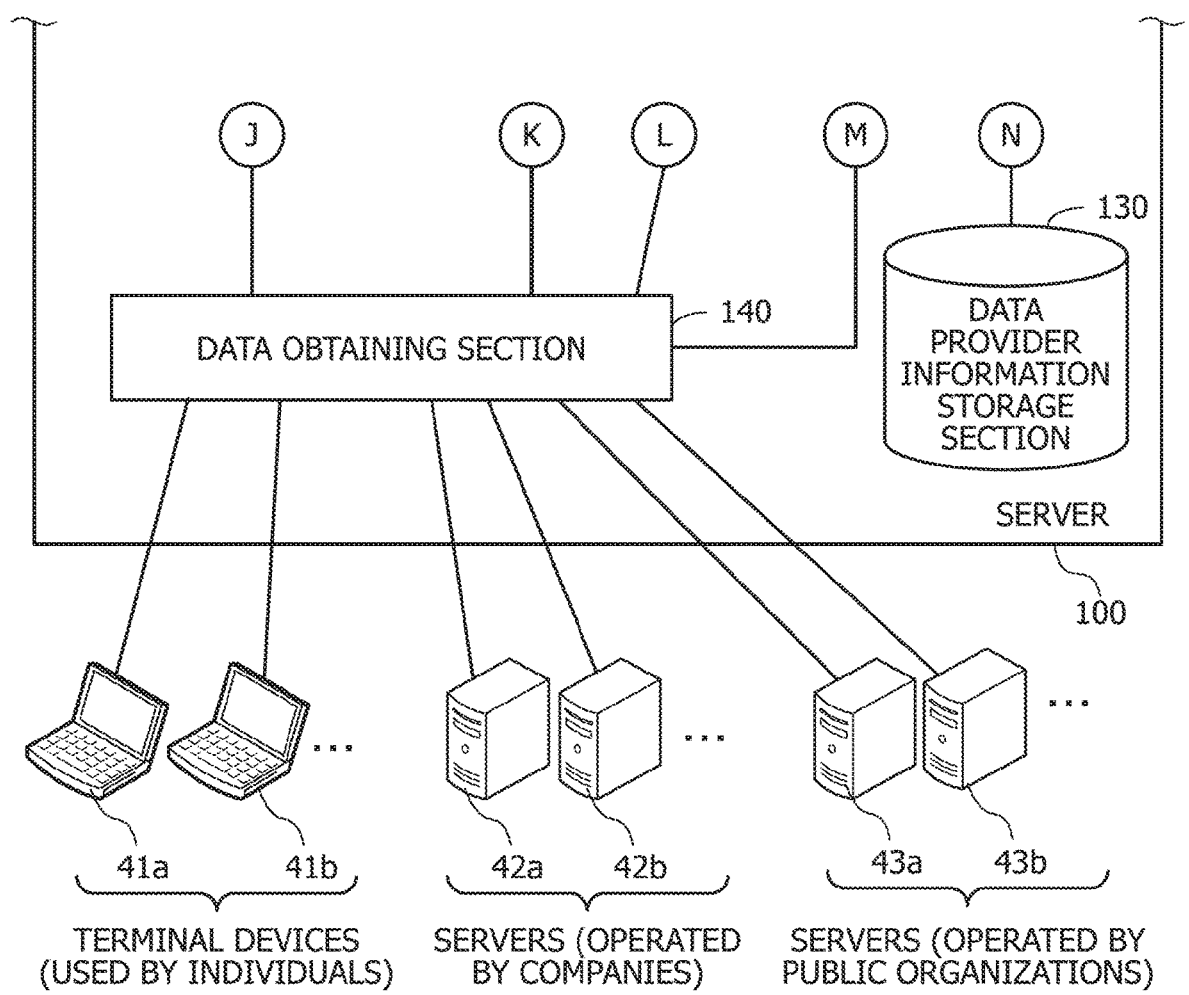

FIGS. 4A and 4B depict a block diagram illustrating functions implemented by a server of a data distribution base. The server 100 of the data distribution base 30 includes a personal data store (PDS) 110, a database (DB) 120, a data provider information storage section 130, a data obtaining section 140, a data search section 150, a data manipulating section 160, a combination pattern dictionary storage section 170, a data management level determining section 180, and a data management information storage section 190.

The PDS 110 is a database for storing personal information. The server 100 strictly manages the data stored in the PDS 110 so that the data does not leak to the outside without a permission being received from a provider of the data.

The DB 120 stores data other than the personal information. The DB 120, for example, stores anonymous manipulated information, statistical information, open data, and the like. The server 100 appropriately manages the data stored in the DB 120 according to the types of the data.

The data provider information storage section 130 stores information regarding data providers (data provider information). The data provider information is registered in advance by an administrator of the data distribution base 30.

The data obtaining section 140 obtains data from devices on a data provider side, such as the terminal devices 41a, 41b, . . . for individual use, the servers 42a, 42b, . . . operated by companies, the servers 43a, 43b, . . . operated by public organizations, and the like. For example, the data obtaining section 140 receives a data storing request from a device on the data provider side, and obtains data indicated in the data storing request from the device. The data obtaining section 140 may also request data from a device on the data provider side in given timing, and obtain the data from the device. When the data obtaining section 140 obtains the data, the data obtaining section 140 requests the data management level determining section 180 to determine the management level of the obtained data. The data obtaining section 140 then adds, to the obtained data, metadata indicating the management level of the data, and stores the data in the PDS 110 or the DB 120. For example, in a case where the obtained data is personal information, the data obtaining section 140 stores the data in the PDS 110. In addition, in a case where the obtained data is data of a management level other than that of personal information, the data obtaining section 140 stores the data in the DB 120.

The data search section 150 searches for data within the PDS 110 and the DB 120 in response to a search request from the servers 44a, 44b, . . . operated by data users, and transmits a search result to a server as a transmission source of the search request. The data search section 150, for example, includes, in the search result, the name of data matching a search condition and the management level of the data.

The data manipulating section 160 manipulates data within the PDS 110 or the DB 120 in response to a data manipulation request from the servers 44a, 44b, . . . operated by the data users. The data manipulating section 160 transmits the data after the manipulation to the data management level determining section 180, and requests the data management level determining section 180 to determine a management level. When the management level of the data after the manipulation is identified, the data manipulating section 160 transmits the data after the manipulation with the management level added thereto to a server as a transmission source of the data manipulation request.

Incidentally, the data manipulating section 160 includes a data combination generating section 161, an anonymization executing section 162, and a statistical processing executing section 163 in order to manipulate data. The data combination generating section 161 generates one data table by combining a plurality of pieces of data registered in different data tables within the PDS 110 or the DB 120. The anonymization executing section 162 performs processing of anonymizing personal information within the PDS 110. The statistical processing executing section 163 calculates statistical information of data within the PDS 110 or the DB 120.

The combination pattern dictionary storage section 170 stores a combination pattern dictionary indicating item combination patterns such that individuals can be identified by combining the values of a plurality of items with each other.

The data management level determining section 180 determines the management level of data. For example, the data management level determining section 180 determines the management level of data obtained by the data obtaining section 140 based on a request from the data obtaining section 140. In addition, the data management level determining section 180 determines the management level of data after manipulation by the data manipulating section 160 based on a request from the data manipulating section 160. The data management level determining section 180 determines the management level of data based on the data provider information stored in the data provider information storage section 130, for example.

The data management level determining section 180 determines that the management level of data including an item capable of identifying an individual, for example, is personal information. In addition, in a case where an individual can be identified by a combination of the values of a plurality of items within obtained data, the data management level determining section 180 determines that the management level of the data is personal information. For example, the obtained data may include an item of age and an item of gender. In general, even when ages and genders of a large number of people are identified, it is impossible to identify the corresponding individuals. For example, when a record of a "female 45 years old" appears a plurality of times within data, it is impossible to identify a person among a plurality of people in the records, and therefore the data has anonymity. However, when there is only one record of a "female 45 years old" within data, for example, an individual corresponding to the record can be identified. In this case, the data does not ensure sufficient anonymity. Accordingly, when there is a record whose number of times of appearance when the values of a plurality of items within the data are combined with each other is equal to or less than a given value (one, for example), the data management level determining section 180 determines that the management level of the data is "personal information."

In addition, the data management level determining section 180 determines that the management level of data appropriately manipulated so as to make it impossible to identify an individual is anonymous manipulated information. In a case where obtained data is only statistical information, the data management level determining section 180 determines that the management level is statistical information. Further, in a case where determination target data is data including only information disclosed by a public organization, for example, the data management level determining section 180 determines that the management level of the data is open data.

Incidentally, for combinations of items registered in the combination pattern dictionary, the data management level determining section 180 checks for the presence of a record including a value equal to or less than a given value as the number of times of appearance thereof when the values of a plurality of items are combined with each other. Thus, using the combination pattern dictionary prepared in advance obviates a need for checking rarity of the values of items for a combination of the items including an item having a low possibility of leading to the identification of an individual. An improvement in efficiency of the processing is therefore achieved.

The data management information storage section 190 stores the management information of the data stored in the PDS 110 or the DB 120. The management information of the data includes metadata indicating the management levels of the data.

It is to be noted that lines coupling the elements illustrated in FIGS. 4A and 4B to one another represent a part of communication paths, and that communication paths other than the communication paths illustrated in the figure may also be set. In addition, functions of the respective elements illustrated in FIGS. 4A and 4B may be implemented by making a computer execute program modules corresponding to the elements, for example.

Next, the data provider information will be described concretely with reference to FIGS. 5 to 8.

Figure 5:
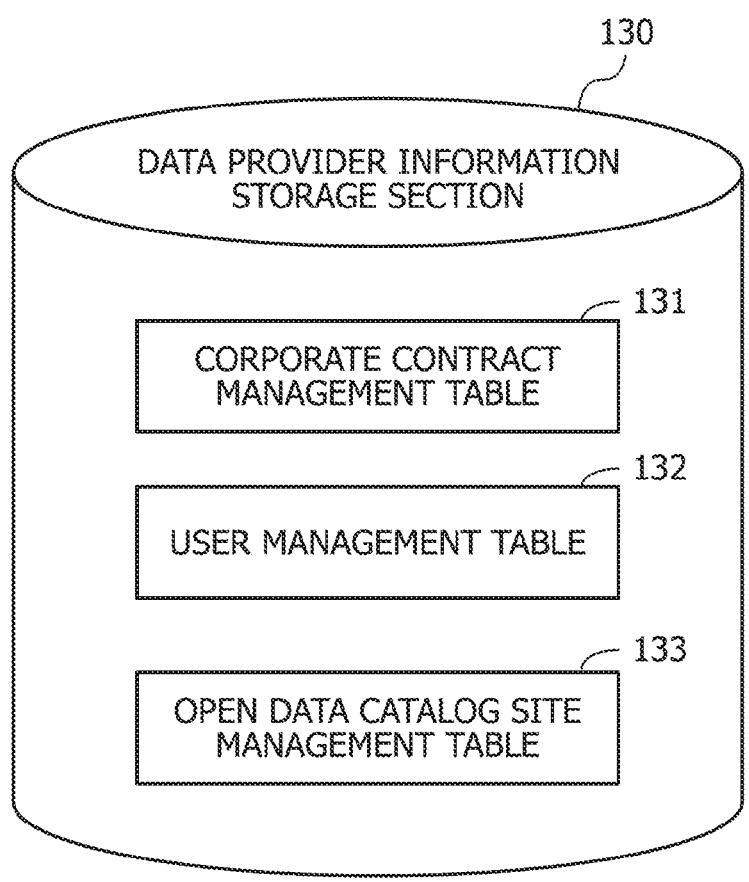
FIG. 5 is a diagram illustrating an example of data provider information.

FIG. 5 is a diagram illustrating an example of data provider information. The data provider information storage section 130 stores, for example, a corporate contract management table 131, a user management table 132, and an open data catalog site management table 133 as the data provider information. The corporate contract management table 131 is a data table in which information regarding corporations that have made a contract to be provided with data is registered. The user management table 132 is a data table in which information regarding users providing data is registered. The open data catalog site management table 133 is a data table in which information regarding sites providing information disclosed to the general public is registered. The contents of the respective data tables stored in the data provider information storage section 130 are managed by an operation administrator of the data distribution base 30.

FIG. 6 is a diagram illustrating an example of a corporate contract management table. Each record within the corporate contract management table 131 has a corporate identifier (ID), a corporate name, a contract date, an address, and contact information set in association with a record number (No.). The corporate ID is the identifier of a corporation (a company, a public organization, or the like) that has made a contract. The corporate name is the name of the corporation that has made the contract. The contract date is the date of the making of the contract to be provided with data by the corporation. The address is the address of the corporation. The contact information is information indicating the contact information of the corporation (a representative electronic mail address, for example).

FIG. 7 is a diagram illustrating an example of a user management table. Each record within the user management table 132 has a user ID, a contract type, a corporate ID, an account creation date, an email address, and a login password set in association with a record number (No.). The user ID is the name of a user. The contract type is information regarding whether the user has made a contract as a corporation or has made a contract as an individual. The corporate ID is the identifier of the corporation in the case where the user has made a corporate contract. The account creation date is the date of creation of a user account in the server 100. The email address is the electronic mail address of the user. The login password is a password for logging in to the server 100 when the user accesses the server 100 by using a terminal device or the like.

FIG. 8 is a diagram illustrating an example of an open data catalog site management table. Each record within the open data catalog site management table 133 has a site name, an operator, and an internet protocol (IP) address set in association with a record number (No.). The site name is a name indicating the location (site), on the network 20, of a server disclosing open data. The operator is the name of an operator of the server disclosing the open data. The IP address is the IP address of the server disclosing the open data.

Concrete description will next be made of the combination pattern dictionary.

FIG. 9 is a diagram illustrating an example of a combination pattern dictionary. Registered in the combination pattern dictionary 171 stored in the combination pattern dictionary storage section 170 in association with item numbers are combination patterns of items that can identify individuals by being combined with each other.

As for combinations of items illustrated in the combination pattern dictionary 171, the data management level determining section 180 determines the presence or absence of a record in which a combination of the values of a plurality of items when the items are combined with each other has uniqueness. When a record having uniqueness is then detected, the management level of the data is determined to be "personal information."

Concrete description will next be made of data management information. When data is stored in the PDS 110 or the DB 120, the management information of the data is stored in the data management information storage section 190.

FIG. 10 is a diagram illustrating an example of data management information within a data management information storage section. A data management table 191, for example, is stored in the data management information storage section 190. The data management table 191 is provided with fields of a data name, a data storage location, a data size, a registration/creation date and time, a last update date and time, and a management level.

The name of data stored in the PDS 110 or the DB 120 is set in the field of the data name. Whether the storage location of the data is the PDS 110 or the DB 120 is set in the field of the data storage location. The size of the stored data is set in the field of the data size. The date and time of registration or creation of the data is set in the field of the registration/creation date and time. For example, as for data obtained by the data obtaining section 140, a registration date and time is set in the field of the registration/creation date and time. In addition, as for data manipulated by the data manipulating section 160, a creation date and time is set in the field of the registration/creation date and time. The latest update date and time of the data is set in the field of the last update date and time. Metadata indicating the management level of the data is set in the field of the management level.

Concrete description will next be made of data management level determination processing at a time of obtaining data.

Figure 11A:
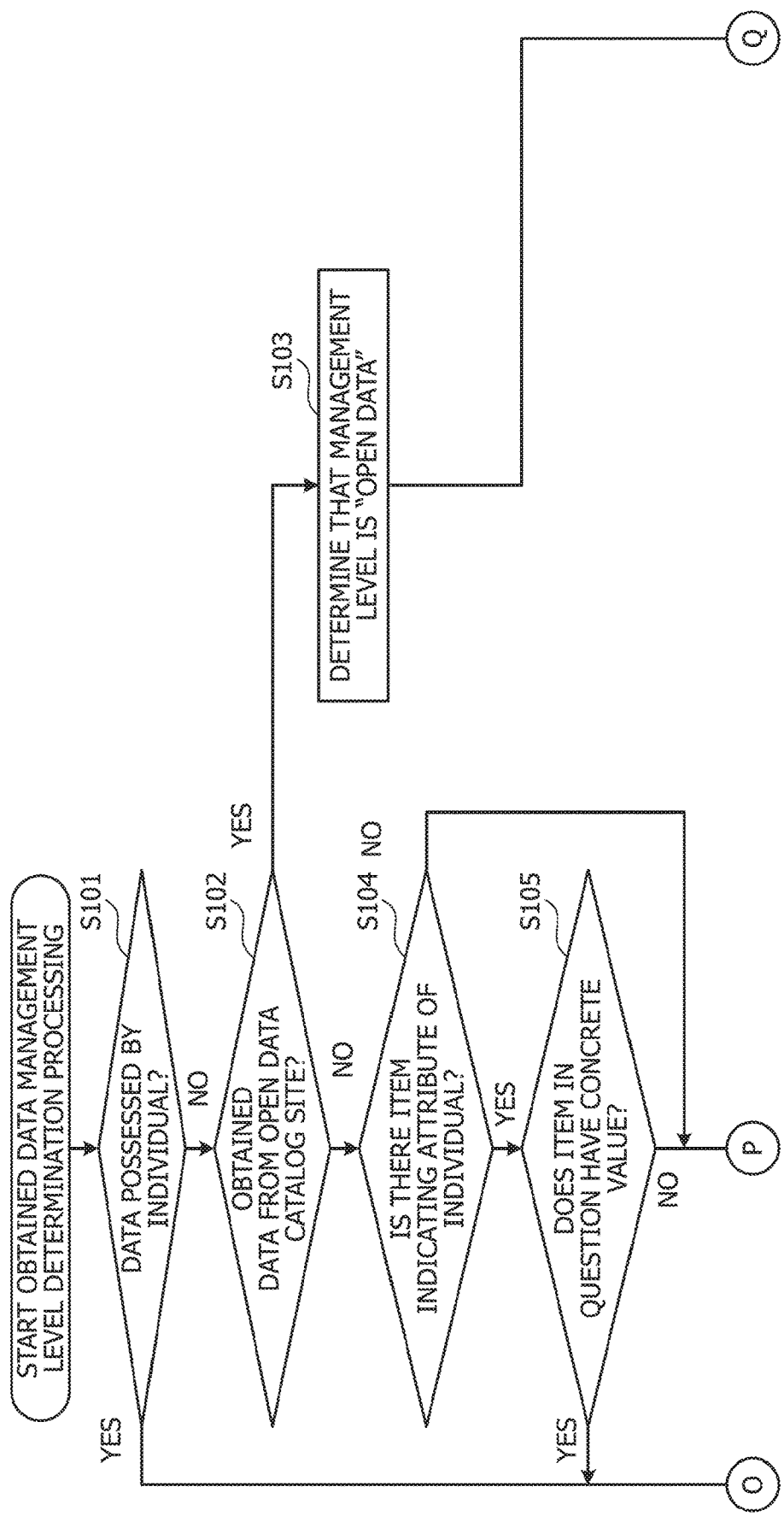
FIGS. 11A and 11B depict a flowchart illustrating an example of a procedure of data management level determination processing at a time of obtaining data.
Figure 11B:
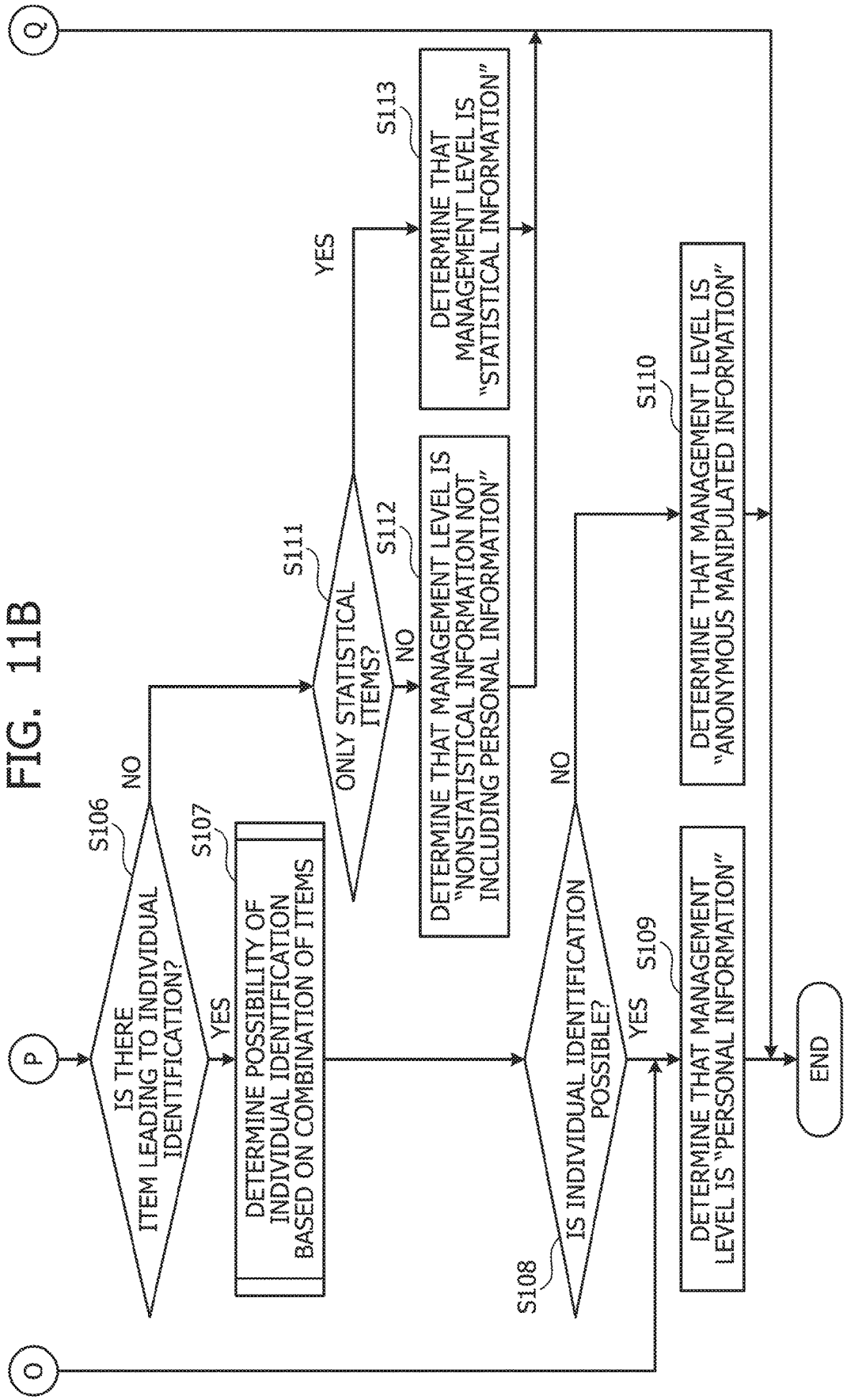

FIGS. 11A and 11B depict a flowchart illustrating an example of a procedure of data management level determination processing at a time of obtaining data. The processing illustrated in FIGS. 11A and 11B will be described in the following along step numbers.

Step S101

The data management level determining section 180 determines whether or not obtained data is data possessed by an individual. For example, the data management level determining section 180 refers to the user management table 132, and determines whether or not the contract type of an account used by a data provider to log in to the server 100 is "individual." When the contract type is "individual," the data management level determining section 180 determines that the obtained data is data possessed by an individual. When the obtained data is data possessed by an individual, the data management level determining section 180 advances the processing to step S109. In addition, when the obtained data is not data possessed by an individual, the data management level determining section 180 advances the processing to step S102.

Step S102

The data management level determining section 180 determines whether or not the obtained data is data obtained from an open data catalog site. For example, when the IP address of an obtainment source of the data is registered in the open data catalog site management table 133, the data management level determining section 180 determines that the data is data obtained from an open data catalog site. When the obtained data is data obtained from an open data catalog site, the data management level determining section 180 advances the processing to step S103. In addition, when the obtained data is not data obtained from an open data catalog site, the data management level determining section 180 advances the processing to step S104.

Step S103

The data management level determining section 180 determines that the management level of the obtained data is open data. The data management level determining section 180 notifies a result of the determination to the data obtaining section 140. The data obtaining section 140 stores the obtained data in the DB 120 in association with metadata indicating open data. For example, the data obtaining section 140 stores the obtained data in the DB 120, and registers, in the data management table 191, a record including the name of the stored data and the management level "open data."

The data management level determining section 180 thereafter ends the data management level determination processing.

Step S104

The data management level determining section 180 determines whether or not the obtained data has an item indicating an attribute of an individual (individual attribute item). The individual attribute item is, for example, an item having a name, a user ID, an email address, an address, or the like as an item name (schema). In addition, a social networking service (SNS) account name, a credit card number, a bank account number, a national individual number, or the like is also associated with an individual on a one-to-one basis, and thus corresponds to the individual attribute item. When there is an item indicating an attribute of an individual, the data management level determining section 180 advances the processing to step S105. In addition, when there is no item indicating an attribute of an individual, the data management level determining section 180 advances the processing to step S106.

Step S105

The data management level determining section 180 determines whether or not a concrete value is set to the item indicating an attribute of an individual. For example, when a field for setting the value of the item indicating an attribute of an individual is a blank field, the data management level determining section 180 determines that no concrete value is set. For example, when personal information is manipulated for anonymity, the field for setting the value of the item indicating an attribute of an individual is a blank field.

Anonymity manipulation is processing of making values indefinite so as to make it impossible to identify individuals even when the values of a plurality of attributes are combined with each other. For example, in anonymity manipulation, the following processing is performed according to the item name (schema) of an item. •Name: all names are deleted, or replaced with random values. •Email Address: only a domain name (following @) is left, and the rest is deleted. •Address: cut down to a prefecture name or the name of a municipality. •Zip Code: cut down to only three high-order digits. •Age: made indefinite by being converted into an age bracket. •A specific value/rare value leading to the identification of an individual is deleted.

When a concrete value is set to the item indicating an attribute of an individual, the data management level determining section 180 advances the processing to step S109. In addition, when no concrete value is set to the item indicating an attribute of an individual, the data management level determining section 180 advances the processing to step S106.

Step S106

The data management level determining section 180 determines whether or not the obtained data has an item name indicating an item leading to the identification of an individual. For example, the data management level determining section 180 supposes that an item included in one of item combination patterns illustrated in the combination pattern dictionary 171 is an item leading to the identification of an individual. When there is an item leading to the identification of an individual, the data management level determining section 180 advances the processing to step S107. In addition, when there is no such item, the data management level determining section 180 advances the processing to step S111.

Step S107

The data management level determining section 180 performs processing of determining a possibility of individual identification based on a combination of items. This processing determines whether or not there is a record having a unique combination of the values of a given plurality of items within the data. When there is such a record, an individual can be identified based on the values of the items. Details of the processing of determining a possibility of individual identification based on a combination of items will be described later (see FIG. 12).

Step S108

The data management level determining section 180 determines whether or not individual identification is determined to be possible by the determination of a possibility of individual identification based on a combination of items. The data management level determining section 180 advances the processing to step S109 when individual identification is determined to be possible. In addition, when individual identification is not determined to be possible, the data management level determining section 180 advances the processing to step S110.

Step S109

The data management level determining section 180 determines that the management level of the obtained data is "personal information." The data management level determining section 180 notifies a result of the determination to the data obtaining section 140. The data obtaining section 140 stores the obtained data in the PDS 110 in association with metadata indicating personal information. For example, the data obtaining section 140 stores the obtained data in the PDS 110, and registers a record including the name of the stored data and the management level "personal information" in the data management table 191. The data management level determining section 180 thereafter ends the data management level determination processing.

Step S110

The data management level determining section 180 determines that the management level of the obtained data is "anonymous manipulated information." The data management level determining section 180 notifies a result of the determination to the data obtaining section 140. The data obtaining section 140 stores the obtained data in the DB 120 in association with metadata indicating the anonymous manipulated information. For example, the data obtaining section 140 stores the obtained data in the DB 120, and registers a record including the name of the stored data and the management level "anonymous manipulated information" in the data management table 191. The data management level determining section 180 thereafter ends the data management level determination processing.

Step S111

The data management level determining section 180 determines whether or not the items of the obtained data are only statistical items. For example, when the item names (schema) of all of the items of the obtained data are only the name of a statistical target and names indicating statistics of the statistical target (an average value, a mode, a maximum value, a minimum value, a median value, a standard deviation, and the like), the data management level determining section 180 determines that the items of the obtained data are only statistical items. When the items of the obtained data are only statistical items, the data management level determining section 180 advances the processing to step S113. In addition, when the items of the obtained data include at least one item that is not a statistical item, the data management level determining section 180 advances the processing to step S112.

Step S112

The data management level determining section 180 determines that the management level of the obtained data is "nonstatistical information not including personal information." The data management level determining section 180 notifies a result of the determination to the data obtaining section 140. The data obtaining section 140 stores the obtained data in the DB 120 in association with metadata indicating nonstatistical information not including personal information. For example, the data obtaining section 140 stores the obtained data in the DB 120, and registers a record including the name of the stored data and the management level "nonstatistical information not including personal information" in the data management table 191. The data management level determining section 180 thereafter ends the data management level determination processing.

Step S113

The data management level determining section 180 determines that the management level of the obtained data is "statistical information." The data management level determining section 180 notifies a result of the determination to the data obtaining section 140. The data obtaining section 140 stores the obtained data in the DB 120 in association with metadata indicating statistical information. For example, the data obtaining section 140 stores the obtained data in the DB 120, and registers a record including the name of the stored data and the management level "statistical information" in the data management table 191. The data management level determining section 180 thereafter ends the data management level determination processing.

Detailed description will next be made of the processing of determining a possibility of individual identification based on a combination of items.

Figure 12:
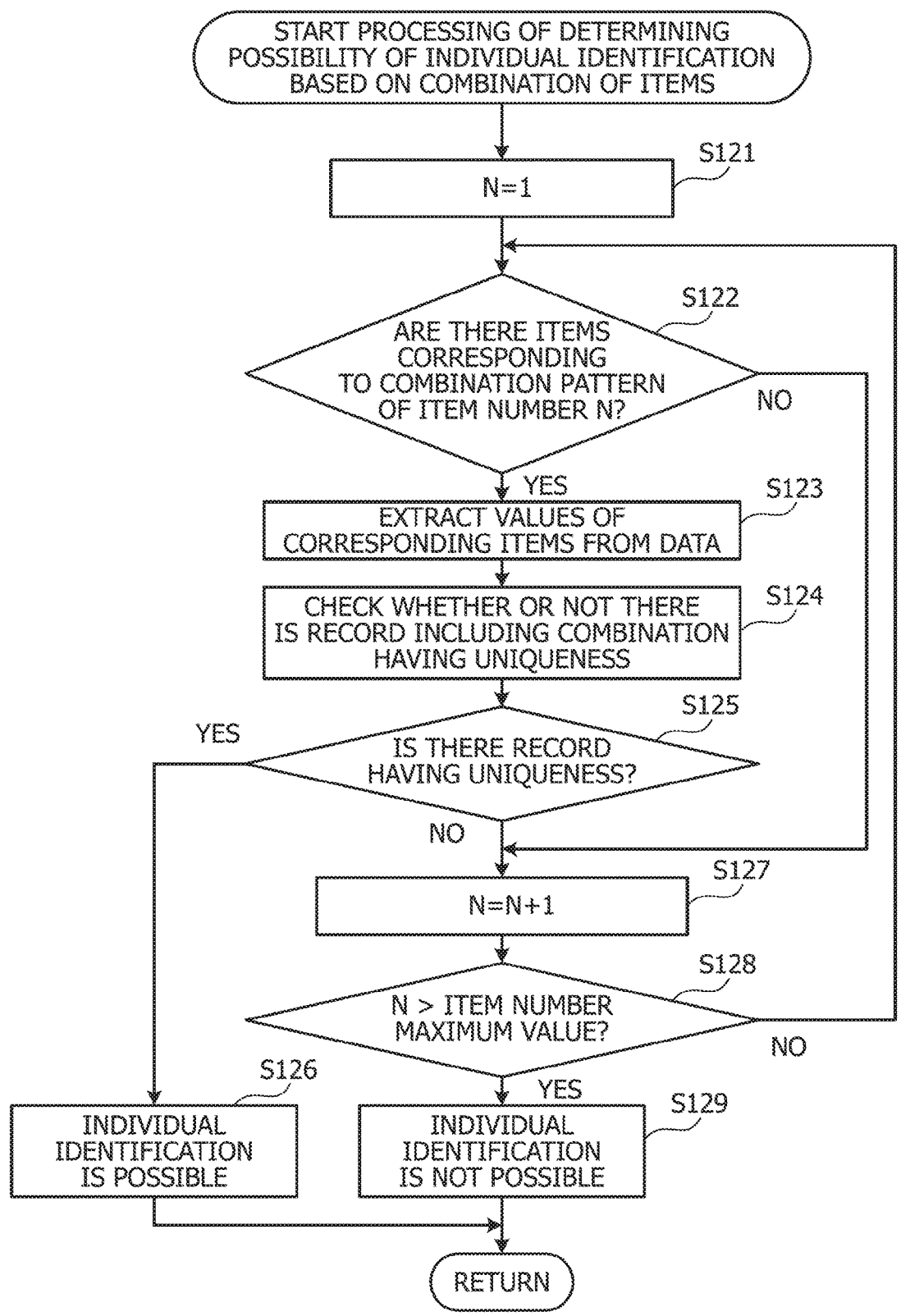
FIG. 12 is a flowchart illustrating an example of a procedure of processing of determining a possibility of individual identification based on a combination of items.

FIG. 12 is a flowchart illustrating an example of a procedure of processing of determining a possibility of individual identification based on a combination of items. The processing illustrated in FIG. 12 will be described in the following along step numbers.

Step S121

The data management level determining section 180 sets an initial value "1" to a variable N indicating the item number of a determination target.

Step S122

The data management level determining section 180 determines whether or not the obtained data includes items indicated in a combination pattern whose item number is "N" in the combination pattern dictionary 171. When there are such items, the data management level determining section 180 advances the processing to step S123. In addition, when there are no such items, the data management level determining section 180 advances the processing to step S127.

Step S123

The data management level determining section 180 extracts the values of items indicated in the combination pattern whose item number is "N" from each record of the obtained data.

Step S124

The data management level determining section 180 compares the combinations of the extracted values between records, and checks whether or not there is a record including a combination having uniqueness. For example, the data management level determining section 180 sets each of a plurality of records within the obtained data as a checking target, and compares a combination of the values of items extracted from the checking target record with a combination of the values of items extracted from each of the other records. When there is no record including a matching combination of the values of the items as a result of the comparison, the data management level determining section 180 determines that the checking target record is a record having uniqueness.

Step S125

The data management level determining section 180 determines whether or not there is at least one record having uniqueness. When there is at least one record having uniqueness, the data management level determining section 180 advances the processing to step S126. In addition, when there is no record having uniqueness, the data management level determining section 180 advances the processing to step S127.

Step S126

The data management level determining section 180 determines that an individual can be identified, and then ends the processing.

Step S127

The data management level determining section 180 adds "1" to the value of the variable N.

Step S128

The data management level determining section 180 determines whether or not the value of the variable N is larger than a maximum value of the item numbers in the combination pattern dictionary 171. When the value of the variable N exceeds the maximum value of the item numbers, the data management level determining section 180 advances the processing to step S129. In addition, when the value of the variable N is equal to or less than the maximum value of the item numbers, the data management level determining section 180 advances the processing to step S122.

Step S129

The data management level determining section 180 determines that individual identification is not possible, and then ends the processing.

The management level of the obtained data is thus determined. In the following, referring to FIGS. 13 to 22, description will be made of concrete examples of determination of the management level of the obtained data.

Figure 13:
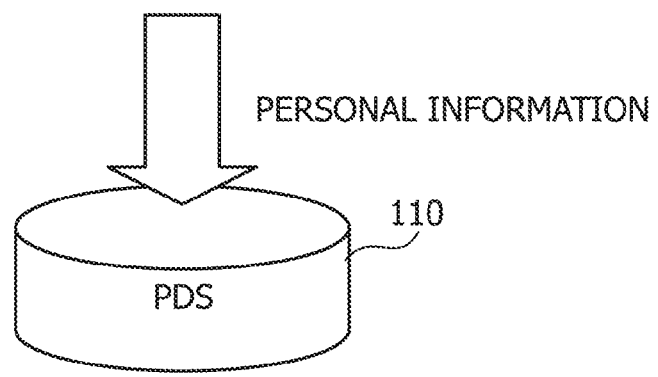
FIG. 13 is a diagram illustrating a first example of determination of a management level.

FIG. 13 is a diagram illustrating a first example of determination of a management level. FIG. 13 illustrates an example in a case where step number data 51 is obtained. The step number data 51 is data indicating daily numbers of steps measured by a pedometer owned by an individual. The step number data 51 includes an item "name" indicating an attribute of an individual, and concrete data capable of identifying the individual is recorded as the item. Hence, the management level of the step number data 51 is determined to be "personal information," and the step number data 51 is stored in the PDS 110.

Figure 14:
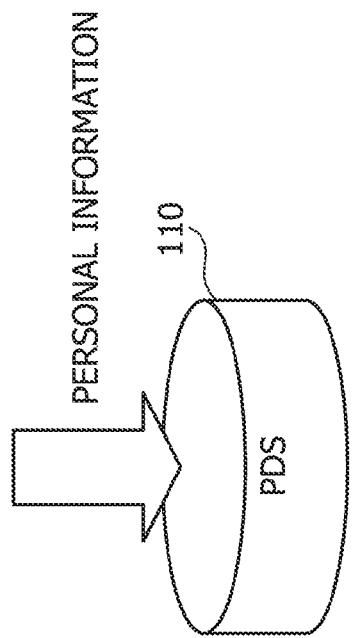
FIG. 14 is a diagram illustrating a second example of determination of a management level.

FIG. 14 is a diagram illustrating a second example of determination of a management level. FIG. 14 illustrates an example in a case where a credit card usage history 52 possessed by a company is obtained. The credit card usage history 52 is data indicating a history of usage by users of credit cards issued by the company. The credit card usage history 52 includes an item "card holder name" indicating an attribute of an individual, and concrete data capable of identifying the individual is recorded as the item. Hence, the management level of the credit card usage history 52 is determined to be "personal information," and the credit card usage history 52 is stored in the PDS 110.

Figure 15:
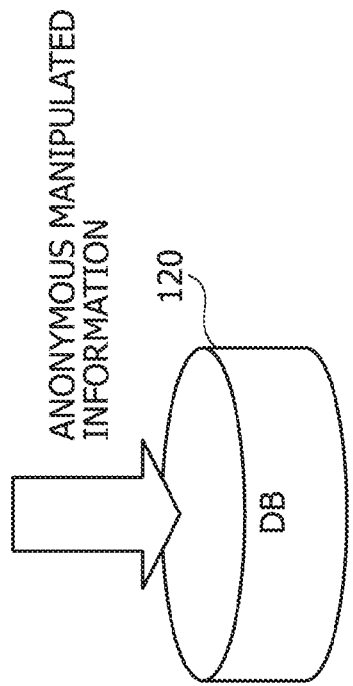
FIG. 15 is a diagram illustrating a third example of determination of a management level.

FIG. 15 is a diagram illustrating a third example of determination of a management level. FIG. 15 illustrates an example in a case where a credit card usage history 53 resulting from anonymity manipulation by a company is obtained. The credit card usage history 53 includes an item "card holder name" indicating an attribute of an individual, but concrete data capable of identifying the individual is not recorded as the item. In addition, while the credit card usage history 53 includes items "gender" and "age" of attributes leading to individual identification, the values of ages are replaced with age brackets of ages, and the items do not include concrete values capable of identifying individuals. Hence, the management level of the credit card usage history 53 is determined to be "anonymous manipulated information," and the credit card usage history 53 is stored in the DB 120.

Figure 16:
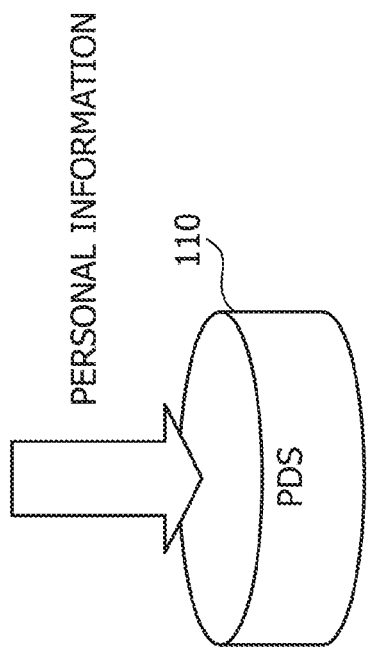
FIG. 16 is a diagram illustrating a fourth example of determination of a management level.

FIG. 16 is a diagram illustrating a fourth example of determination of a management level. FIG. 16 illustrates an example in a case where medical checkup data 54 possessed by a health insurance society is obtained. The medical checkup data 54 is data obtained by recording results of a medical checkup performed on members of the health insurance society. The medical checkup data 54 includes an item "name" indicating an attribute of an individual, and concrete data capable of identifying the individual is recorded as the item. Hence, the management level of the medical checkup data 54 is determined to be "personal information," and the medical checkup data 54 is stored in the PDS 110.

Figure 17:
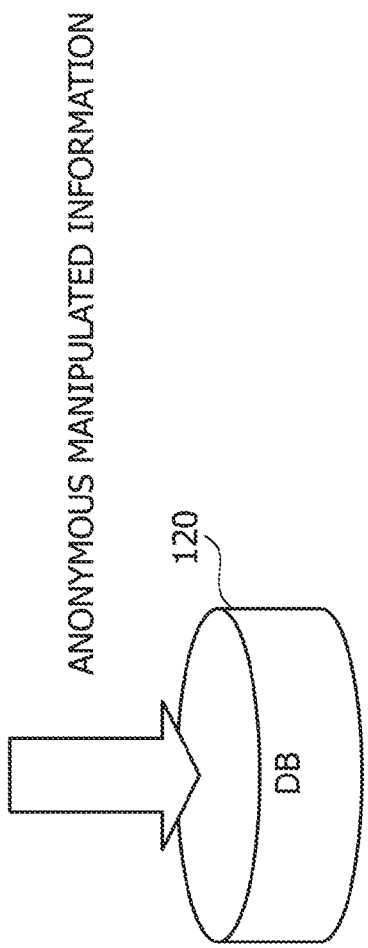
FIG. 17 is a diagram illustrating a fifth example of determination of a management level.

FIG. 17 is a diagram illustrating a fifth example of determination of a management level. FIG. 17 illustrates an example in a case where medical checkup data 55 resulting from anonymity manipulation by the health insurance society is obtained. The medical checkup data 55 includes an item "name" indicating an attribute of an individual, but concrete data capable of identifying the individual is not recorded as the item. In addition, the medical checkup data 55 includes the items "gender," "birth date," "age," "height," "weight," and "blood pressure" of attributes leading to individual identification. However, of these items, the value of "birth date" is deleted, and the values of "age," "height," and "weight" are replaced with values indicating intervals having given ranges. Hence, the management level of the medical checkup data 55 is determined to be "anonymous manipulated information," and the medical checkup data 55 is stored in the DB 120.

Figure 18:
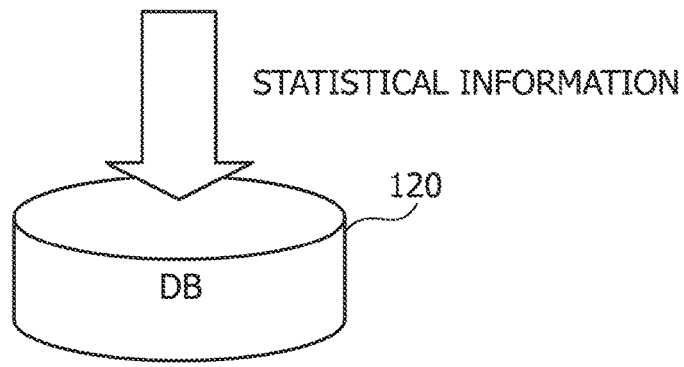
FIG. 18 is a diagram illustrating a sixth example of determination of a management level.

FIG. 18 is a diagram illustrating a sixth example of determination of a management level. FIG. 18 illustrates an example in a case where medical checkup data 56 after statistical processing is performed is obtained. The medical checkup data 56 neither includes an item indicating an attribute of an individual nor includes an item leading to individual identification. The medical checkup data 56 includes only items "total number of people," "average age," "minimum age," and "maximum age" indicating statistics, excluding an item "disease name" indicating a statistic calculation target. Hence, the management level of the medical checkup data 56 is determined to be "statistical information," and the medical checkup data 56 is stored in the DB 120.

FIG. 19 is a diagram illustrating a seventh example of determination of a management level. FIG. 19 illustrates an example in a case where an infrastructure operation log 57 of a factory A owned by a company is obtained. The operation log 57 indicates the presence or absence of operation in each day for each facility of the factory. The operation log 57 neither includes an item indicating an attribute of an individual nor includes an item of an attribute leading to individual identification. In addition, the items of the operation log 57 are not necessarily only items of statistical information. Hence, the management level of the operation log 57 is determined to be "nonstatistical information not including personal information," and the operation log 57 is stored in the DB 120.

Figure 20:
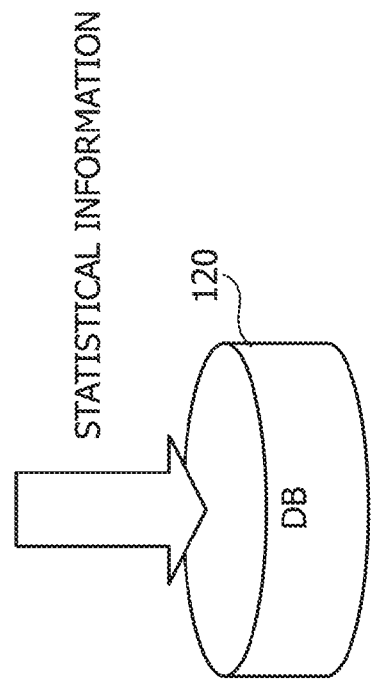
FIG. 20 is a diagram illustrating an eighth example of determination of a management level.

FIG. 20 is a diagram illustrating an eighth example of determination of a management level. FIG. 20 illustrates an example in a case where aggregation data 58 is obtained, the aggregation data 58 being related to the numbers of visitors and sales of establishments owned by companies. The aggregation data 58 indicates a total number of visitors and total sales in each month for each establishment. The aggregation data 58 neither includes an item indicating an attribute of an individual nor includes an item of an attribute leading to individual identification. In addition, the aggregation data 58 includes only items "total number of visitors" and "total sales" indicating total values as statistics, excluding an item "establishment name" indicating a statistic calculation target. Hence, the management level of the aggregation data 58 is determined to be "statistical information," and the aggregation data 58 is stored in the DB 120.

Figure 21:
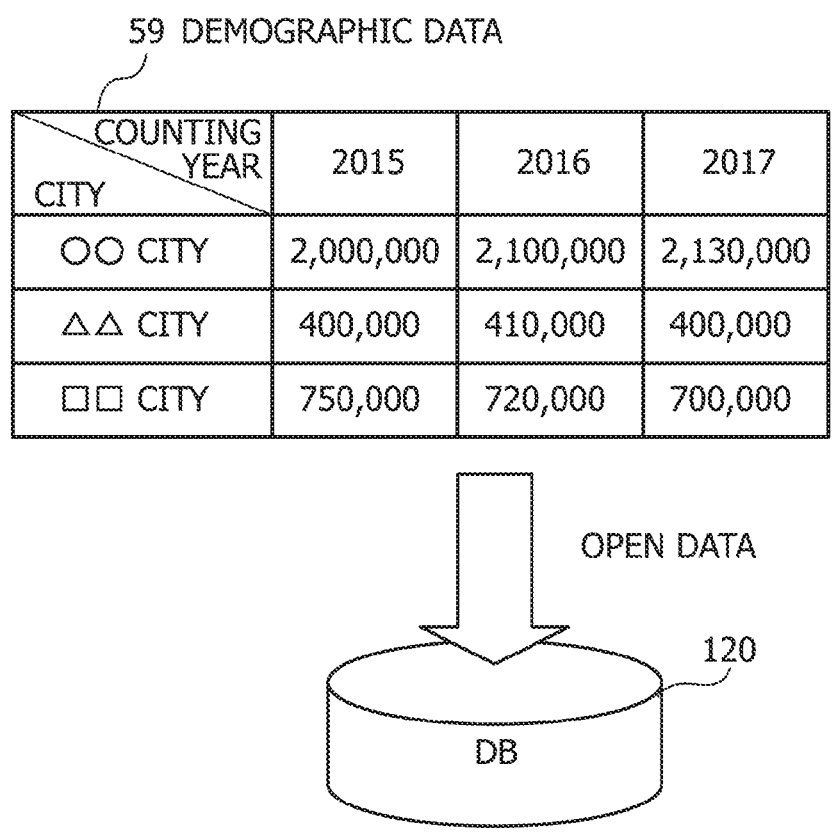
FIG. 21 is a diagram illustrating a ninth example of determination of a management level.

FIG. 21 is a diagram illustrating a ninth example of determination of a management level. FIG. 21 illustrates an example in a case where demographic data 59 is obtained, the demographic data 59 being related to municipal population changes disclosed as open data by a municipality (prefecture). The demographic data 59 indicates the population of each city in each year. The demographic data 59 is provided on an open data catalog site of the municipality. Hence, the management level of the demographic data 59 is determined to be "open data," and the demographic data 59 is stored in the DB 120.

Figure 22B:

FIGS. 22A and 22B depict a diagram illustrating a 10th example of determination of a management level. FIGS. 22A and 22B illustrate an example in a case where a seminar attendee list 60 is obtained. Set for each seminar attendee in the seminar attendee list 60 are a family name, the company name of a company to which the seminar attendee belongs, the job title of the seminar attendee within the company, and a date of attendance of the seminar. The family name, company name, job title, and date of attendance of the seminar attendee do not singly indicate an individual attribute. In this case, the data management level determining section 180 determines whether or not there is a record having uniqueness based on the combination pattern dictionary 171 illustrated in FIG. 9.

As for the item numbers "1" to "5" in the combination pattern dictionary 171, combinations of items corresponding to the item combination patterns are not present within the seminar attendee list 60. Both of the items of the item combination pattern "family name and company name" of the item number "6" in the combination pattern dictionary 171 are present within the seminar attendee list 60. Accordingly, the data management level determining section 180 extracts the items "family name" and "company name" from the seminar attendee list 60, and determines whether or not there is a record (record having uniqueness) having the values of the extracted items which values are not the same in the other records. In the example of FIGS. 22A and 22B, as for the combination pattern of the items "family name" and "company name," there is no record having uniqueness.

Each of the items of the item combination pattern "family name, company name, and job title" of the item number "7" in the combination pattern dictionary 171 is present within the seminar attendee list 60. Accordingly, the data management level determining section 180 extracts the items "family name," "company name," and "job title" from the seminar attendee list 60, and determines whether or not there is a record (record having uniqueness) including the values of the extracted items which values are not the same in the other records. In the example of FIGS. 22A and 22B, there is only one record in which the value of the item "family name" is "Sato," the value of the item "company name" is "company A," and the value of the item "job title" is "division chief." This record therefore has uniqueness. In addition, there is only one record in which the value of the item "family name" is "Sato," the value of the item "company name" is "company A," and the value of the item "job title" is blank. This record therefore also has uniqueness. In this case, the management level of the seminar attendee list 60 is determined to be "personal information," and the seminar attendee list 60 is stored in the PDS 110.

Thus, appropriate management levels are set to the obtained data, and the obtained data is managed according to the management levels within the server 100. For example, the server 100 limits users who can access data having the management level "personal information," and thus manages the data so that the contents of the data do not leak to the outside without a permission of a provider of the data. In addition, the server 100 manages anonymous manipulated information so as not to use the anonymous manipulated information in a manner prohibited by a law, for example. Further, the server 100 manages statistical information so as not to disclose the statistical information to the general public, for example. Open data is disclosed data, and therefore there is no reason for performing special management for the open data. Accordingly, the server 100 stores open data in an area where any user who can access the server 100, for example, can view the open data.

Users of data stored in the server 100 may obtain the data within the server 100 via the servers 44a and 44b operated by the users of the data, for example. A data user, for example, inputs a search condition on a search screen by using the server 44a. Then, a search request based on the search condition is transmitted from the server 44a to the server 100 retaining the data. In the server 100, the data search section 150 searches the data according to the search request, and transmits a list of data matching the search condition as a search result to the server 44a. The search result includes information indicating the management level of the data matching the search condition. The server 44a, for example, displays the search result within the search screen.

FIG. 23 is a diagram illustrating an example of a search screen. The search screen 70, for example, includes a text box 71 for search keyword input and a search result display region 72. The text box 71 is a field for inputting a keyword representing a search condition. The search result display region 72 is a region for displaying a list of data matching the search condition.

In the example of FIG. 23, "purchase behavior data" is input in the text box 71. In this case, the server 100 retrieves data related to purchase behavior from the PDS 110 or the DB 120, and generates search result information by classifying the names of the pertinent data by management level. The search result information is transmitted from the server 100 to the server 44a, and is displayed within the search screen 70.

Displaying such a search screen 70 on a terminal device used by the data user, for example, enables the data user to easily grasp the management level desired for the data before obtaining the data. As a result, an improvement in efficiency of data management is achieved.

In addition, the data user may, for example, specify the name of data indicated on the search screen 70 to purchase and downloaded the data from the data distribution base 30 or make a request to manipulate the specified data. For example, the data user selects data found on the search screen 70, and inputs an instruction to display detailed information. Then, a data manipulation request screen is displayed by the server 44*a*.

FIG. 24 is a diagram illustrating an example of a data manipulation request screen. The data manipulation request screen 80 displays buttons 81 to 84 for giving an instruction to obtain or manipulate selected data (meal log of A).

The button 81 is a button for giving an instruction to download the selected data. In a case where the management level of the selected data is "personal information," a check box 86 is displayed on the side of the button 81, the check box 86 indicating an agreement to strictly manage the data as personal information. When the button 81 is depressed after the check box 86 is checked, processing of downloading the selected data is started.

The button 82 is a button for giving an instruction for anonymity manipulation of the data. When the button 82 is depressed, anonymity manipulation of the selected data is performed in the server 100, and the data manipulated for anonymity is sent as a manipulation result to the server 44*a*.

The button 83 is a button for giving an instruction to manipulate statistical information of the data. When the button 83 is depressed, manipulation of the statistical information of the selected data is performed in the server 100, and the statistical information is sent as a manipulation result to the server 44*a*.

The button 84 is a button for giving an instruction to perform manipulation for combination with other data. When the button 84 is depressed, a screen for selecting other data to be combined is displayed. When the data user selects the other data, new data obtained by combining the selected data is generated in the server 100, and the generated data is sent as a manipulation result to the server 44*a*.

A button 85 is a button for displaying the data search screen 70. When the button 85 is depressed, the screen is changed to the search screen 70.

When the data user inputs an instruction for data manipulation on the data manipulation request screen 80 displayed by the server 44*a*, the server 44*a* transmits a data manipulation request to the server 100. Then, the data manipulating section 160 of the server 100 performs data manipulation processing according to the data manipulation request. When the data manipulating section 160 manipulates data, the data management level determining section 180 determines a management level for the data after the manipulation.

Figure 25A:
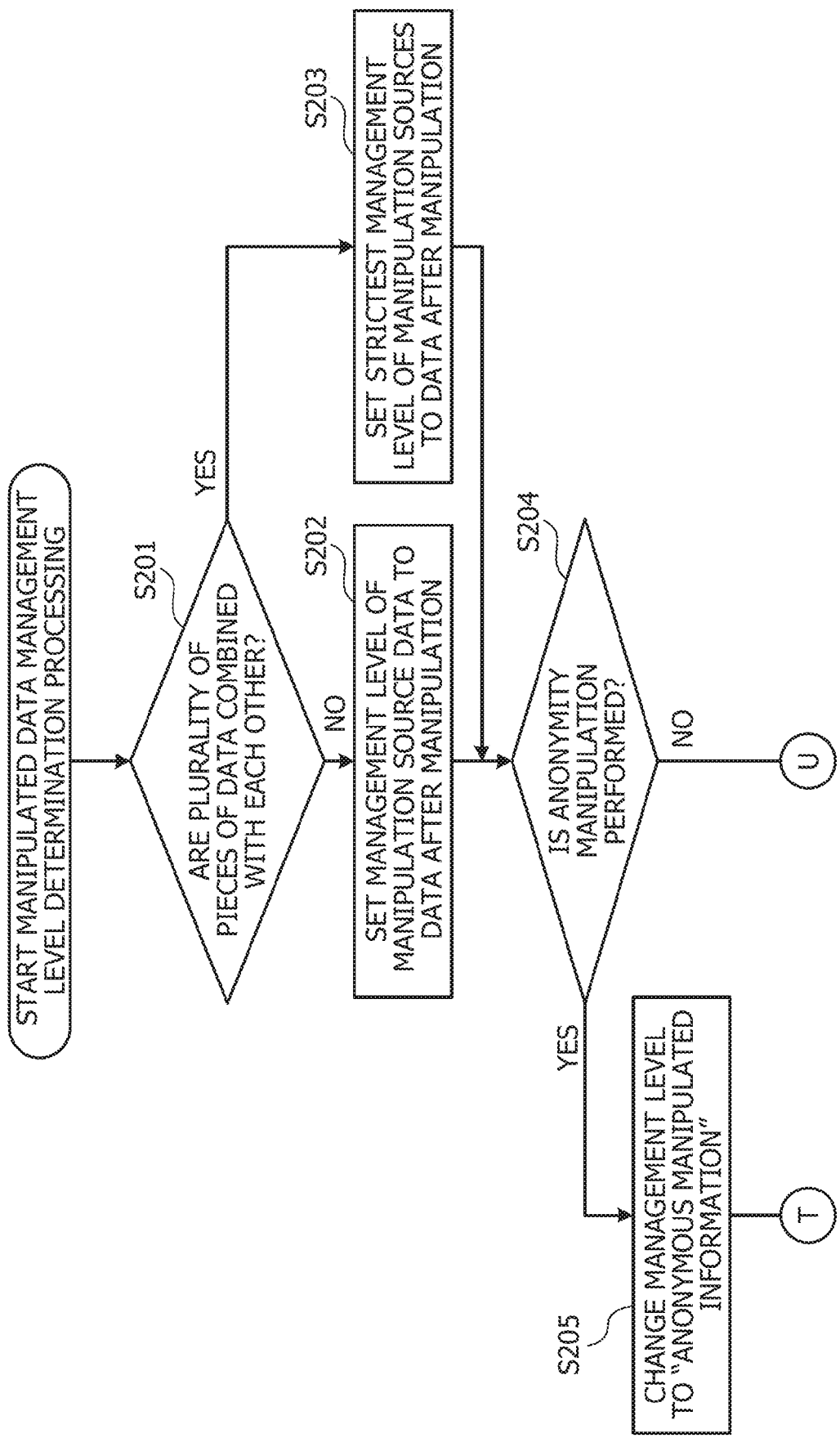
Figure 25B:
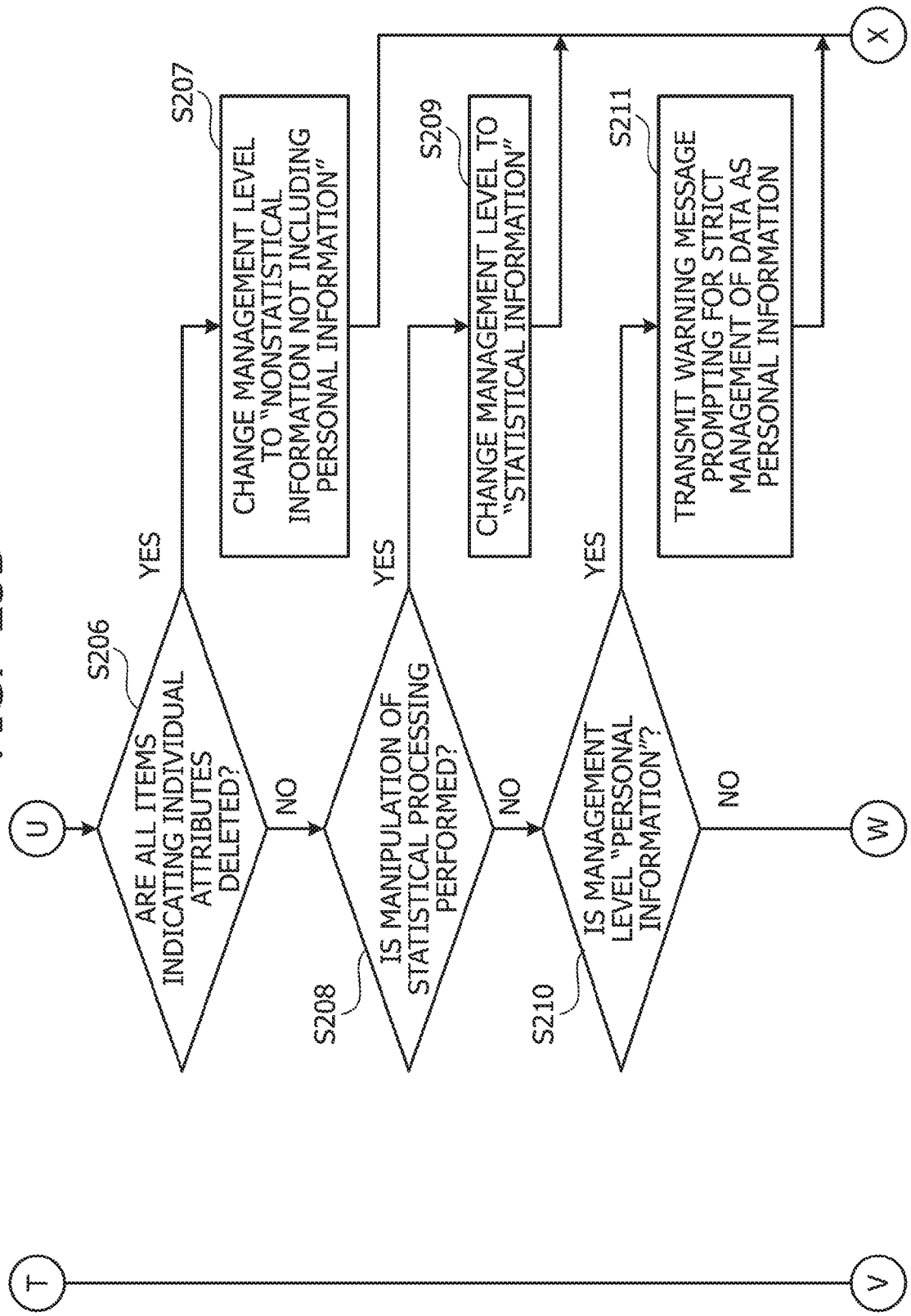

FIGS. 25A to 25C depict a flowchart illustrating an example of a procedure of manipulated data management level determination processing. The processing illustrated in FIGS. 25A to 25C will be described in the following along step numbers.

Step S201

The data management level determining section 180 determines whether or not a plurality of pieces of data are combined with each other in data manipulation processing. When data manipulation processing combining a plurality of pieces of data with each other is performed, the data management level determining section 180 advances the processing to step S203. In addition, when data manipulation processing on one piece of data is performed, the data management level determining section 180 advances the processing to step S202.

Step S202

The data management level determining section 180 sets the management level of the manipulation source data as the management level of data after manipulation. Thereafter, the data management level determining section 180 advances the processing to step S204.

Step S203

The data management level determining section 180 sets the strictest management level of the management levels applied to the respective pieces of manipulation source data as the management level of the data after the manipulation.

Step S204

The data management level determining section 180 determines whether or not anonymity manipulation is performed in the data manipulation processing. When the anonymity manipulation is performed, the data management level determining section 180 advances the processing to step S205. In addition, when the anonymity manipulation is not performed, the data management level determining section 180 advances the processing to step S206.

Step S205

The data management level determining section 180 changes the management level of the data after the manipulation to "anonymous manipulated information," and then advances the processing to step S213.

Step S206

The data management level determining section 180 determines whether or not items indicating individual attributes are all deleted in the data manipulation processing. When the items indicating the individual attributes are all deleted, the data management level determining section 180 advances the processing to step S207. In addition, when the items indicating the individual attributes remain, the data management level determining section 180 advances the processing to step S208.

Step S207

The data management level determining section 180 changes the management level of the data after the manipulation to "nonstatistical information not including personal information," and then ends the management level determination processing.

Step S208

The data management level determining section 180 determines whether or not manipulation of statistical processing is performed in the data manipulation processing. When the statistical processing is performed, the data management level determining section 180 advances the processing to step S209. In addition, when the statistical processing is not performed, the data management level determining section 180 advances the processing to step S210.

Step S209

The data management level determining section 180 changes the management level of the data after the manipulation to "statistical information," and then ends the management level determination processing.

Step S210

The data management level determining section 180 determines whether or not the management level of the data after the manipulation is "personal information." When the management level is "personal information," the data management level determining section 180 advances the processing to step S211. In addition, when the management level is not "personal information," the data management level determining section 180 advances the processing to step S212.

Step S211

The data management level determining section 180 transmits a warning message prompting for strict management of the data after the manipulation as personal information to the server 44a as a transmission source of the data manipulation request. The data management level determining section 180 thereafter ends the management level determination processing.

Step S212

The data management level determining section 180 determines whether or not the management level of the data after the manipulation is "anonymous manipulated information." When the management level is "anonymous manipulated information," the data management level determining section 180 advances the processing to step S213. In addition, when the management level is not "anonymous manipulated information," the data management level determining section 180 ends the management level determination processing.

Step S213

The data management level determining section 180 transmits a warning message prompting for management of the data after the manipulation as anonymous manipulated information to the server 44a as a transmission source of the data manipulation request.

Thus, the management level of the manipulated data is determined according to the management levels of the manipulation source data and the content of manipulation.

Figure 26A:
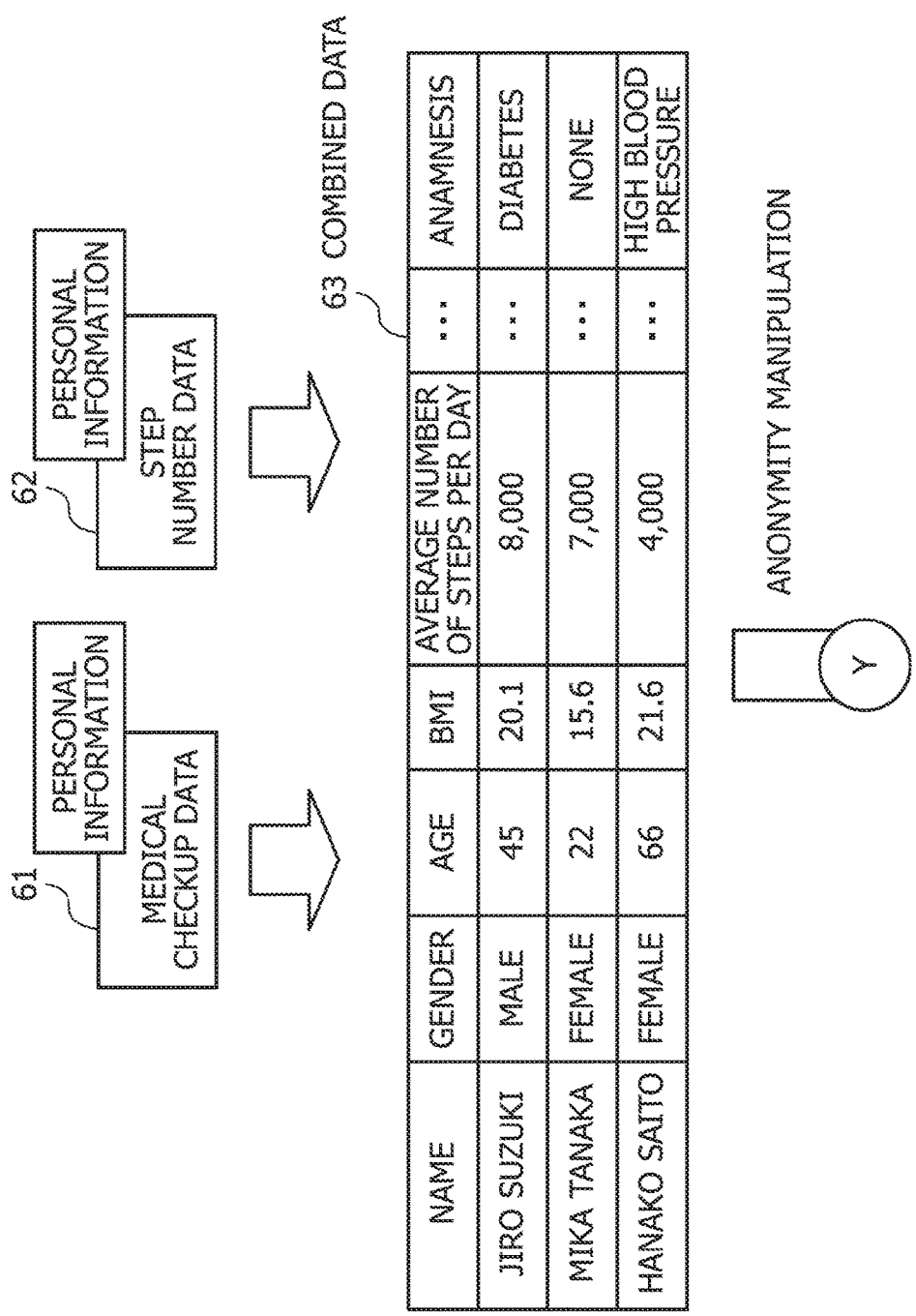

FIGS. 26A and 26B depict a diagram illustrating a first example of manipulated data management level determination processing. FIGS. 26A and 26B illustrate an example in a case where combined data 63 is generated by combining medical checkup data 61 and step number data 62 with each other. The management level of the medical checkup data 61 is "personal information," and the management level of the step number data 62 is also "personal information." The combined data 63 obtained by combining the medical checkup data 61 and the step number data 62 with each other may, for example, be used to analyze correlation between amounts of exercise (numbers of steps) and metabolic syndrome and various kinds of diseases.

In the case of the combined data 63, the management level of the manipulation source data is "personal information," and the item "name" indicating an individual attribute is left without being deleted. Thus, the combined data 63 as it has the management level "personal information." When anonymity manipulation is performed on the combined data 63 in the data manipulation processing, the value of the item "name," for example, is deleted. The management level of combined data 64 after the anonymity manipulation is "anonymous manipulated information."

Figure 27:
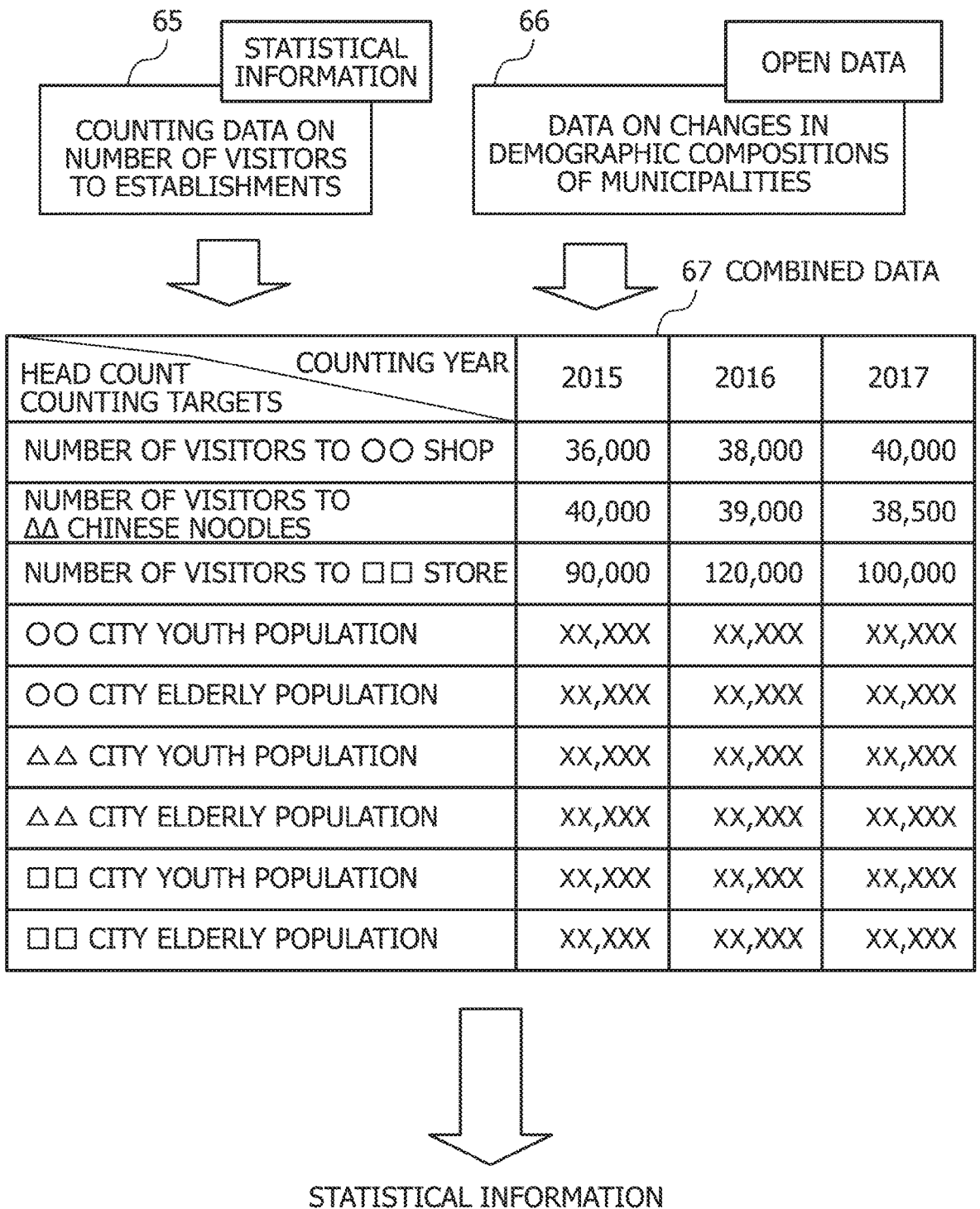
FIG. 27 is a diagram illustrating a second example of a manipulated data management level determination processing.

FIG. 27 is a diagram illustrating a second example of manipulated data management level determination processing. FIG. 27 illustrates an example in a case where combined data 67 is generated by combining, with each other, counting data 65 on the numbers of visitors to establishments on a year-by-year basis and data 66 on changes in demographic compositions of municipalities, the data 66 being disclosed as open data by the municipalities. The management level of the counting data 65 on the numbers of visitors to establishments is "statistical information." In addition, the management level of the data 66 on changes in the demographic compositions of the municipalities is "open data." The combined data 67 obtained by combining the counting data 65 on the numbers of visitors to establishments and the data 66 on changes in the demographic compositions of the municipalities with each other may, for example, be used to predict sales in the future or develop a marketing strategy.

The stricter management level of the management levels of the manipulation source data is applied to the combined data 67. Hence, the management level of the combined data 67 is "statistical information."

Appropriate management levels may be thus determined for the manipulated data, so that data users may be prompted for appropriate management of the manipulated data.

Other Embodiments

In the second embodiment, whether or not there is a record having uniqueness is determined as a condition in which an individual can be identified by combining the values of a plurality of items with each other. However, it may be determined that an individual can be identified when there is a record that does not have uniqueness but has rarity. For example, in a case where there are a given number of records or fewer that have an identical combination of the values of a plurality of items, the data management level determining section 180 determines that those records have rarity, and determines that data including the records can identify an individual.

Embodiments have been illustrated above. However, the configurations of respective parts illustrated in the embodiments may be replaced with other configurations having similar functions. In addition, other arbitrary structures or processes may be added. Further, two or more arbitrary configurations (features) of the foregoing embodiments may be combined with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:

obtaining data in which a value is set to at least a part of one or a plurality of items from a device coupled to the computer via a network;

determining a management level to be applied to the data from among a plurality of management levels having different information protection measure strengths based on an item name of each of the one or the plurality of items of the data and presence or absence of a setting of a value to each of the one or the plurality of items;

storing the data in a memory in association with management information indicating the management level applied to the data;

generating manipulated data by manipulating the data according to a data manipulation request requesting manipulation of the data stored in the memory;

determining a management level of the manipulated data based on the management level of the data as a manipulation source and a content of the manipulation; and outputting information indicating the management level of the manipulated data and the manipulated data, wherein the generating manipulated data includes deleting a value of individual attribute items of personal information data used as the manipulation source, and the determining determines the management level of the manipulated data as another management level of a lower protection strength than the personal information management level when individual attribute items to which a value capable of identifying an individual is set are all deleted from the data.

2. The non-transitory computer readable recording medium according to claim 1, wherein the determining determines the management level applied to the data is a personal information management level when the item name of each of the one or the plurality of items includes an item name of an individual attribute item capable of identifying an individual, and a value is set to the individual attribute item.

3. The non-transitory computer readable recording medium according to claim 2, wherein the determining determines the management level applied to the data is an anonymous manipulated information management level when the item name of each of the one or the plurality of items includes the item name of the individual attribute item, but no value is set to the individual attribute item.

4. The non-transitory computer readable medium according to claim 3, the process further comprising:

performing anonymity manipulation on personal information to obtain anonymous manipulated information data.

5. The non-transitory computer readable recording medium according to claim 1, wherein the data includes a plurality of records, each record including at least a first item and a second item, and the process further comprises:

comparing a value of the first item and a value of the second item of the plurality of records; and the determining determines the management level applied to the data is the personal information management level when a number of the plurality of records having a same value of the first item and a same value of the second item is less than a threshold value.

6. The non-transitory computer readable recording medium according to claim 1, wherein the determining determines the management level applied to the data is a statistical information management level when the one or the plurality of items are an item indicating a statistical target or an item indicating a name of a statistical value.

7. The non-transitory computer readable recording medium according to claim 1, wherein the data includes a position of an obtainment source of the data on the network, and the determining determines the management level applied to the data is an open data management level when the position of the obtainment source of the data corresponds to open data positional information indicating a storage location of open data useable without limitation.

8. The non-transitory computer readable recording medium according to claim 1, further comprising:

searching the memory for data in response to a data search request specifying a search condition; and outputting a search result indicating a name and a management level of pertinent data matching the search condition.

9. A method performed by a computer, the method comprising:

obtaining data in which a value is set to at least a part of one or a plurality of items from a device coupled to the computer via a network;

determining a management level to be applied to the data from among a plurality of management levels having different information protection measure strengths based on an item name of each of the one or the plurality of items of the data and presence or absence of a setting of a value to each of the one or the plurality of items;

storing the data in a memory in association with management information indicating the management level applied to the data;

generating manipulated data by manipulating the data according to a data manipulation request requesting manipulation of the data stored in the memory;

determining a management level of the manipulated data based on the management level of the data used as a manipulation source and a content of the manipulation; and outputting information indicating the management level of the manipulated data and the manipulated data.

10. A computer-implemented data distribution system comprising:

a memory configured to store a plurality of data respectively assigned with a plurality of different management levels for protecting information; and a processor coupled to the memory and configured to determine a management level assigned to data of the plurality of data from among the plurality of different management levels based on an item name of an item included within the data and presence or absence of a value associated with the item, store the data in the memory in association with management information indicating the management level assigned to the data, distribute data according to the management level assigned to the data, determine the management level assigned to the data is a personal information management level when the item name includes an individual attribute capable of identifying an individual, and the value associated with the item is present, generate manipulated data by manipulating the data according to a data manipulation request requesting manipulation of the data stored in the memory, determine a management level of the manipulated data based on the management level of the data used as a manipulation source and a content of the manipulation, output information indicating the management level of the manipulated data and the manipulated data, delete a value associated with items of personal information data used as the manipulation source when generating the manipulated data from the personal information data, and determine the management level of the manipulated data as another management level of a lower protection strength than the personal information management level when the value associated with items of personal information data are all deleted from the personal information data.

11. The computer-implemented data distribution system according to claim 10, wherein the processor is further configured to distribute data between the memory and at least one external device via the network.

12. The computer-implemented data distribution system according to claim 10, wherein the processor determines the management level applied to the data is an anonymous manipulated information management level when the item name includes the individual attribute, but the value associated with the item is absent.

13. The computer-implemented data distribution system according to claim 12, wherein the processor is further configured to perform anonymity manipulation on data that is personal information data to obtain anonymous manipulated information data.

14. The computer-implemented data distribution system according to claim 10, wherein
the data includes a plurality of records, each record including at least a first item and a second item, and the processor is further configured to
compare a value of the first item and a value of the second item of the plurality of records; and
determine the management level applied to the data is the personal information management level when a number of the plurality of records having a same value of the first item and a same value of the second item is less than a threshold value.

15. The computer-implemented data distribution system according to claim 11, wherein the processor is further configured to
search the memory for data in response to a data search request specifying a search condition received via the network from the at least one external device, and
output a search result to the at least one external device indicating a name and a management level of pertinent data matching the search condition.

* * * * *